United States Patent
Bitra et al.

(10) Patent No.: US 10,284,293 B2
(45) Date of Patent: May 7, 2019

(54) SELECTIVE PIXEL ACTIVATION FOR LIGHT-BASED COMMUNICATION PROCESSING

(71) Applicant: QUALCOMM Incorporated, San Diego, CA (US)

(72) Inventors: Suresh Kumar Bitra, Mangalagiri (IN); Meghna Agrawal, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 15/274,673

(22) Filed: Sep. 23, 2016

(65) Prior Publication Data

US 2018/0091221 A1 Mar. 29, 2018

(51) Int. Cl.
| | | |
|---|---|---|
| *H04B 10/00* | (2013.01) | |
| *H04B 10/116* | (2013.01) | |
| *G01S 5/16* | (2006.01) | |
| *H04N 5/232* | (2006.01) | |

(52) U.S. Cl.
CPC .............. *H04B 10/116* (2013.01); *G01S 5/16* (2013.01); *G01S 5/163* (2013.01); *H04N 5/232* (2013.01)

(58) Field of Classification Search
CPC . H04B 10/116; H04B 10/1129; H04B 10/118; H04B 10/11; H04B 10/1143; H04B 10/114; H04B 10/502; H04B 10/60; G01S 5/16; G01S 5/163; H04N 5/232; G08C 23/04
USPC ........... 398/118, 122, 123, 128–131, 172, 25
See application file for complete search history.

(56) References Cited

U.S. PATENT DOCUMENTS

| | | | | |
|---|---|---|---|---|
| 7,023,476 B2 * | 4/2006 | Deangelis | ........... | A63B 24/0003 348/222.1 |
| 7,379,673 B2 * | 5/2008 | Krill | ................... | H04B 10/118 398/118 |
| 7,561,802 B2 * | 7/2009 | Krill | ................... | H04B 10/118 398/121 |

(Continued)

FOREIGN PATENT DOCUMENTS

| | | |
|---|---|---|
| CN | 1702984 A | 11/2005 |
| CN | 101159821 B | 7/2013 |

OTHER PUBLICATIONS

International Search Report and Written Opinion—PCT/US2017/043621—ISA/EPO—dated Nov. 7, 2017.

*Primary Examiner* — Hibret A Woldekidan
(74) *Attorney, Agent, or Firm* — Hunter Clark PLLC

(57) ABSTRACT

Disclosed are methods, systems, devices, apparatus, computer-/processor-readable media, and other implementations, including a method to process one or more light-based signals that includes determining mobile device data and coarse previous field-of-view (FOV) data representative of pixels of a light-capture device of a mobile device that detected light-based signals from at least one light device located in an area where the mobile device is located, determining, based on the mobile device data and the coarse previous FOV data, predicted one or more pixels of the light-capture device of the mobile device likely to receive light signals from one or more light devices, in the area where the mobile device is located, capable of emitting one or more light-based communications, and activating the predicted one or more pixels of the light-capture device.

25 Claims, 11 Drawing Sheets

(56) References Cited

U.S. PATENT DOCUMENTS

| | | | |
|---|---|---|---|
| 8,531,523 B2* | 9/2013 | Anderson | H04W 4/02 |
| | | | 348/143 |
| 9,094,615 B2* | 7/2015 | Aman | G01S 3/7864 |
| 9,232,353 B2* | 1/2016 | Bozarth | H04N 7/18 |
| 9,576,556 B2* | 2/2017 | Simmons | G02B 27/225 |
| 9,813,150 B1* | 11/2017 | Bitra | H04B 10/116 |
| 9,838,121 B2* | 12/2017 | Roberts | H04L 27/10 |
| 9,851,442 B1* | 12/2017 | Lo | G01S 17/08 |
| 9,857,162 B1* | 1/2018 | Gum | G01B 11/002 |
| 9,897,688 B2* | 2/2018 | Choiniere | G01S 7/484 |
| 10,014,939 B2* | 7/2018 | Cha | H04B 10/116 |
| 2002/0140822 A1 | 10/2002 | Kahn et al. | |
| 2003/0035178 A1* | 2/2003 | Seaver | H04B 10/1121 |
| | | | 398/129 |
| 2005/0265731 A1 | 12/2005 | Keum et al. | |
| 2011/0170005 A1* | 7/2011 | Bornstein | H04N 5/4401 |
| | | | 348/555 |
| 2012/0045215 A1* | 2/2012 | Kim | H04B 10/116 |
| | | | 398/128 |
| 2014/0247346 A1* | 9/2014 | Bozarth | H04N 7/18 |
| | | | 348/143 |
| 2014/0301737 A1 | 10/2014 | Guo et al. | |
| 2015/0023669 A1 | 1/2015 | Jiang | |
| 2015/0215547 A1* | 7/2015 | Muller | G01J 3/2803 |
| | | | 348/598 |
| 2015/0304032 A1 | 10/2015 | Hyde et al. | |
| 2018/0212678 A1* | 7/2018 | Gummadi | H04B 10/116 |
| 2018/0287700 A1* | 10/2018 | Gummadi | H04B 10/116 |

* cited by examiner

SELECTIVE PIXEL ACTIVATION FOR LIGHT-BASED COMMUNICATION PROCESSING

BACKGROUND

Visual Light Communication (VLC) is a technology in which light devices/sources (e.g., LED light fixtures) broadcast data (e.g., positioning signals) using rapid modulation of light. In many cases, the light devices/sources will also be used to provide illumination. The light signals may be received, in some embodiments, by mobile devices (e.g., smartphones) via built-in camera (image) sensors, and can be used to compute the device's position in a venue. Image sensors, however, consume considerable power when detecting and decoding light-based communication (such as VLC), and/or when implementing such procedures as VLC positioning procedures.

SUMMARY

In some variations, a method to process one or more light-based signals is provided. The method includes determining mobile device data and coarse previous field-of-view (FOV) data representative of pixels of a light-capture device of a mobile device that detected light-based signals from at least one light device located in an area where the mobile device is located, determining, based on the mobile device data and the coarse previous FOV data, predicted one or more pixels of the light-capture device of the mobile device likely to receive light signals from one or more light devices, in the area where the mobile device is located, capable of emitting one or more light-based communications, and activating the predicted one or more pixels of the light-capture device.

Embodiments of the method may include at least some of the features described in the present disclosure, including one or more of the following features.

The mobile device data may include, for example, orientation data for the mobile device, location estimate data for the mobile device, motion data for the mobile device, and/or usage data for the mobile device representative of processes executing on the mobile device.

Determining the predicted one or more pixels may include determining location information for the one or more light devices, and determining the predicted one or more pixels based further on the location information for the one or more light devices.

The location information for the one or more light devices may include, for example, 1) assistance data for the one or more light devices representative of positions of the one or more light devices and/or orientation of the one or more light devices, and/or 2) prior detection information regarding previous light detection operations performed by the mobile device.

Determining the predicted one or more pixels may include determining one or more future field of views (FOV's) for the mobile device based on the mobile device data and the coarse previous FOV data for the mobile device.

Determining the one or more future FOV's may include determining current pixel locations of a current set of active pixels of the light-capture device receiving the light-based signals from the at least one light device, and adjusting the current pixel locations of the current set of the active pixels receiving light signals from the light-based signals of the at least one light device during subsequent time instances based on the mobile device data, with the adjusted locations of the current set of active pixels corresponding to probable pixels of the light-capture device likely to receive the light-based signals of the at least one light device during the subsequent time instances.

Determining the coarse previous FOV data for the mobile device may include downsampling the pixels of the light-capture device of the mobile device to cause selective activation of some of the pixels of the light-capture device. Determining the predicted one or more pixels may include determining one or more future FOV's for the mobile device based, at least in part, on the downsampled pixels for the light-capture device of the mobile device.

Downsampling the pixels of the light-capture device may include activating different pixel locations at different pixel rows of the light-capture device.

The method may further include determining a light signal level for received light emissions corresponding to a light-based signal from the at least one light device. Determining the predicted one or more pixels of the light-capture device may include determining the predicted one or more pixels based further on the light signal level for the received light emissions corresponding to the light-based signal from the at least one light device.

Determining the predicted one or more pixels based further on the light signal level for the received light emissions corresponding to the light-based signal from the at least one light device may include deactivating at least some of currently activated pixels of the light-capture device in response to a determination that the light signal level for the received light emissions exceeds an SNR threshold.

Determining the predicted one or more pixels based further on the light signal level for the received light emissions corresponding to the light-based signal from the at least one light device may include increasing a frame rate of the light-capture device, and deactivating at least some of currently activated pixels of the light-capture device, upon increasing the frame rate, in response to a determination that the light signal level for the received light emissions is below an SNR threshold.

The one or more light-based communications may include one or more visual light communication (VLC) signals. The method may further include decoding the one or more light-based communications, including identifying from image data including the at least one light device the one or more VLC signals representative of one or more symbols comprising one or more VLC codewords encoded in the one or more VLC signals, with the image data being captured by the predicted one or more pixels, and determining, at least in part, the one or more VLC codewords from the one or more VLC signals.

The method may further include determining a location estimate of the mobile device based, at least in part, on the determined one or more VLC codewords.

The light-capture device may include a digital light sensor with rolling shutter capability.

In some variations, a mobile device is provided that includes one or more sensors configured to determine mobile device data for the mobile device, one or more light-capture devices, memory to store computer instructions, and one or more processors coupled to the memory, the one or more sensors, and the one or more light-capture devices. The one or more processors are configured to determine coarse previous field-of-view (FOV) data representative of pixels of a light-capture device, from the one or more light-capture devices, of the mobile device that detected light-based signals from at least one light device located in an area where the mobile device is located, determine, based on the mobile device data and the coarse previous FOV data, predicted one or more pixels of the light-capture device of the mobile device likely to receive light signals from one or more light devices, in the area where the mobile device is located, capable of emitting one or more light-based communications, and activate the predicted one or more pixels of the light-capture device.

In some variations, an apparatus is provided that includes means for determining mobile device data and coarse previous field-of-view (FOV) data representative of pixels of a light-capture device of a mobile device that detected light-based signals from at least one light device located in an area where the mobile device is located, means for determining, based on the mobile device data and the coarse previous FOV data, predicted one or more pixels of the light-capture device of the mobile device likely to receive light signals from one or more light devices capable of emitting one or more light-based communications, and means for activating the predicted one or more pixels of the light-capture device.

In some variation, a non-transitory computer readable media is provided, that is programmed with instructions, executable on a processor, to determine mobile device data and coarse previous field-of-view (FOV) data representative of pixels of a light-capture device of a mobile device that detected light-based signals from at least one light device located in an area where the mobile device is located, determine, based on the mobile device data and the coarse previous FOV data, predicted one or more pixels of the light-capture device of the mobile device likely to receive light signals from one or more light devices, in the area where the mobile device is located, capable of emitting one or more light-based communications, and activate the predicted one or more pixels of the light-capture device.

Embodiments of the mobile device, the apparatus, and the non-transitory computer readable media may include at least some of the features described in the present disclosure, including at least some of the features described above in relation to the method.

Other and further objects, features, aspects, and advantages of the present disclosure will become better understood with the following detailed description of the accompanying drawings.

BRIEF DESCRIPTION OF THE DRAWINGS

Like reference symbols in the various drawings indicate like elements.

DETAILED DESCRIPTION

Described are implementations to selectively activate pixels of a mobile device's light capture device for power optimized light-based communication processing. The implementations described herein may include programmable array sensors in which the image sizes (e.g., which pixels/cells are activated to capture light from the viewable scene) can be controlled. Such programmable sensor/image arrays may also be controlled for sub-sampling operations (in terms of pixels start and stop positions). Based on mobile device data (e.g., the mobile device's orientation and/or motion), environment data (including information about previously detected light devices transmitting light-based signals), and/or available coarse previous field-of-view (FOV) data for the light-capture device of the mobile device (which may be obtained through periodically scanning, via activation of some or all of the pixels of the sensor array of the light-capture device), predicted one or more pixels for subsequent frames (which define future FOV's for the light-capture device) are determined. This allows for only a subset of the pixels of the sensor array to have to be activated, with the other pixels/cells being de-activated, thus resulting in better power utilization for the mobile device.

Thus, in example embodiments, a method is provided that includes determining mobile device data and coarse previous field-of-view (FOV) data representative of pixels of a light-capture device of a mobile device that detected light-based signals from at least one light device located in an area where the mobile device is located, determining, based on the mobile device data and the coarse previous FOV data, predicted one or more pixels of the light-capture device of the mobile device likely to receive light signals from one or more light devices (which may include, or may be different from, the at least one light device from which light-based signals were detected and used to determine the coarse previous FOV), in the area where the mobile device is located, capable of emitting one or more light-based communications, and activating the predicted one or more pixels of the light-capture device. For example, based on a mobile device's orientation (e.g., determined based on its sensors, based on positioning information such as VLC positioning history information, etc.), and based on light device orientation, placement, position, and other such information (which may have been obtained through received assistance data or through self-learning operations based on decoded light signal history), the subsequent pixels that need to be activated (because they are the likely pixels to receive light signals in subsequent frames) can be determined.

Figure 1:
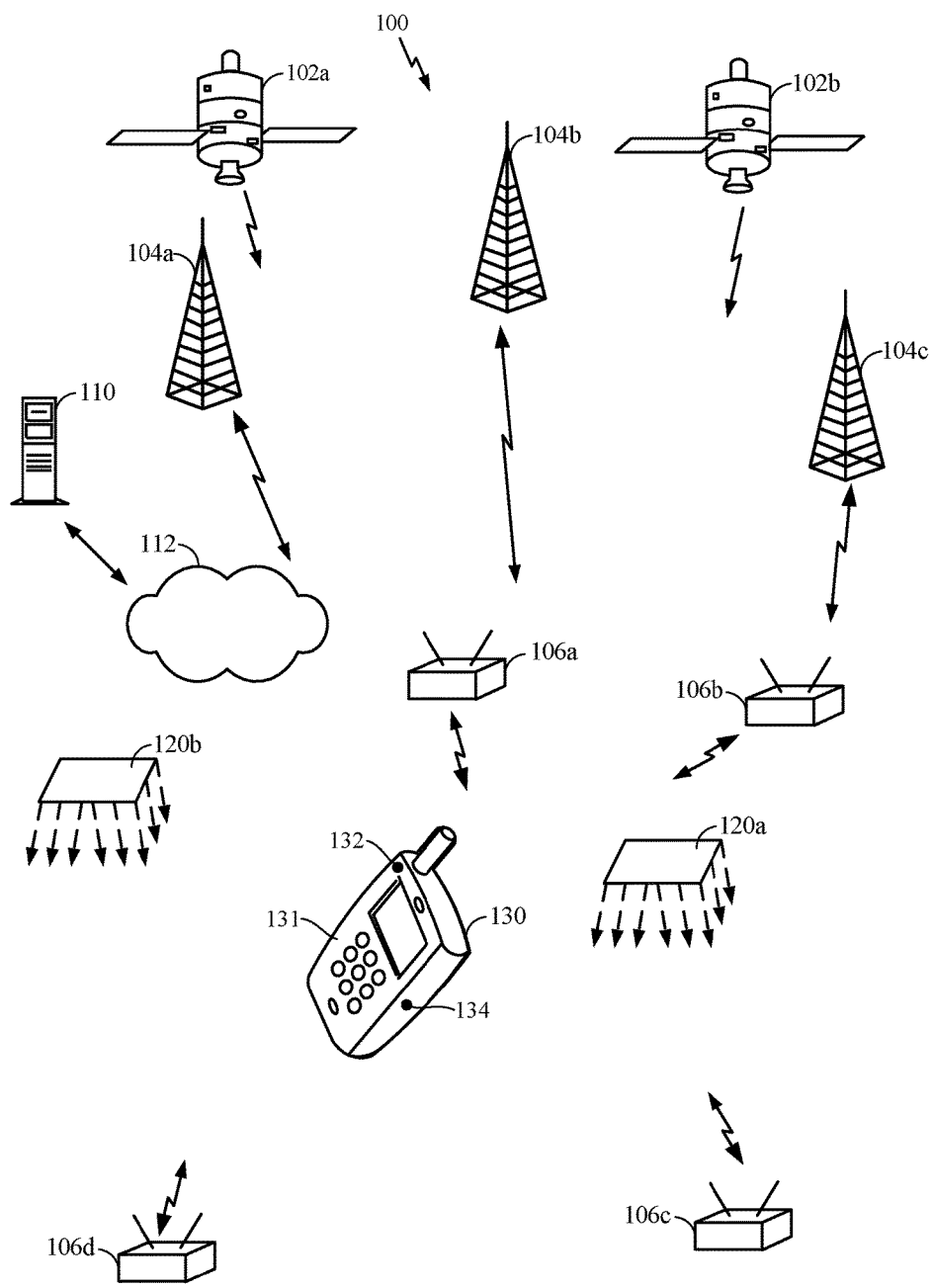
FIG. 1 is a diagram of an example operating environment that includes a wireless mobile device.

With reference to FIG. 1, a diagram of an example operating environment 100 that includes a wireless mobile device 130, configured to perform operations to facilitate determination of the mobile device's location, including selective activation and control of sensor array's pixels, is shown. The wireless device 130 may be configured to communicate according to one or more communication protocols (e.g., near-field protocols, such as Bluetooth® wireless technology or ZigBee, WLAN protocols, such as a WiFi protocol according to IEEE 802.11k standard, WWAN protocols, etc.) The device 130 may be configured, in some embodiments, to determine mobile device data, such as physical state data (including orientation data and/or motion date) of the mobile device (using, for example, inertial sensors), determine a coarse, previous, field-of-view (e.g., determine an earlier FOV by, for example, performing a complete, or downsampled, scan of the scene, to identify areas of the sensor array receiving light-based signals), determine predicted one or more pixels to activate based on the coarse previous FOV and the mobile device data, and activate the predicted one or more pixels. The predicted one or more pixels are those pixels of the sensor array of a light-capture device (such as the cameras 132 or 134 of the mobile device 130) that are likely to receive light-based signals (which are also referred to as "light-based encoded communications" or "optical communications") from one or more light devices (such as the light devices 120a-b). In some embodiments, the other pixels of the sensor array (i.e., the remaining, non-predicted pixels) remain turned off, or are de-activated if they have been in an active state. As depicted in the FIG. 1, the mobile device 130 may include multiple light-capture devices such as, for example, a first light-capture device 132 (which may be disposed at a front surface 131 of the mobile device on which a speaker and a microphone may be further disposed), a second light-capture device 134 disposed on a side surface of light-capture device (e.g., located between the front surface and a rear surface of the mobile device), and/or other light-capture devices. In some embodiments, a mobile device may have other camera configurations. For example, in one implementation, the mobile device may have one front facing camera (i.e., on the mobile device's rear surface) and two cameras (dual cameras) on one rear side. The selective activation of pixels described herein may be performed in relation to each of the cameras, either in independent manner (i.e., each camera controlled independently of the other), or based on some inter-dependence between the camera (i.e., which pixels are activated on one camera may also depend, among other factors, on which pixels are activated on another of the mobile device's cameras).

The mobile device 130 (as well as any other device depicted in FIG. 1) may be configured to operate and interact with multiple types of other communication systems/devices, including local area network devices (or nodes), such as WLAN for indoor communication, femtocells, Bluetooth® wireless technology-based transceivers, and other types of indoor communication network nodes, wide area wireless network nodes, satellite communication systems, other mobile devices, etc., and as such the mobile device 130 may include one or more interfaces and/or transceivers to communicate with the various types of communications systems. The various devices of FIG. 1 may be configured to establish and operate according to any number of communication protocols.

As noted, the environment 100 may contain one or more different types of wireless communication systems or nodes, each of which may be used to establish communication links with the device 130. The nodes illustrated in FIG. 1 include wireless access points (or WAPs) and may include LAN and/or WAN wireless transceivers, including, for example, WiFi base stations, femto cell transceivers, Bluetooth® wireless technology transceivers, cellular base stations, WiMax transceivers, etc. Thus, for example, and with continued reference to FIG. 1, the environment 100 may include the Local Area Network Wireless Access Points (LAN-WAPs) 106a-d that may be used for wireless voice and/or data communication with the mobile device 130. The LAN-WAPs 106a-d may also be utilized, in some embodiments, as independent sources of position data, e.g., through fingerprinting-based procedures, through implementation of multilateration-based procedures based, for example, on timing-based techniques (e.g., RTT-based measurements, observed-time-difference-of-arrival, or OTDOA, in which a mobile device measures time differences in received signals from a plurality of network nodes, and so on), signal strength measurements (e.g., RSSI measurements), etc. The LAN-WAPs 106a-d can be part of a Wireless Local Area Network (WLAN), which may operate in buildings and perform communications over smaller geographic regions than a WWAN. Additionally, in some embodiments, the LAN-WAPs 106a-d could also include pico or femto cells. In some embodiments, the LAN-WAPs 106a-d may be part of, for example, WiFi networks (802.11x), cellular piconets and/or femtocells, Bluetooth® wireless technology Networks, etc. Although four (4) LAN-WAP's are depicted in FIG. 1, any number of such LAN-WAP's may be used, and, in some embodiments, the environment 100 may include no LAN-WAPs at all, or may include a single LAN-WAP.

As further illustrated, the environment 100 may also include a plurality of one or more types of the Wide Area Network Wireless Access Points (WAN-WAPs) 104a-c, which may be used for wireless voice and/or data communication, and may also serve as another source of independent information through which the mobile wireless device 130 (and/or other devices) may determine its position/location. The WAN-WAPs 104a-c may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each WAN-WAPs 104a-c within the WWAN may operate from fixed positions or may be moveable, and may provide network coverage over large metropolitan and/or regional areas. Although three (3) WAN-WAPs are depicted in FIG. 1, any number of such WAN-WAPs may be used. In some embodiments, the environment 100 may include no WAN-WAPs at all, or may include a single WAN-WAP.

Communication to and from the mobile device 130 (to exchange data, and facilitate location determination operations and other services to the device 130, etc.) may be implemented using various wireless communication networks and/or technologies and/or encodings, such as a wide area wireless network (WWAN), a wireless local area network (WLAN), a wireless personal area network (WPAN), a peer-to-peer network, and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other radio access technology (RAT). GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. In some embodiments, 4G networks, Long Term Evolution ("LTE") networks, Advanced LTE networks, Ultra Mobile Broadband (UMB) networks, and all other types of cellular communications networks may also be implemented and used with the systems, devices methods, and other implementations described herein. A WLAN may also be implemented, at least in part, using an IEEE 802.11x network, and a WPAN may be a Bluetooth® wireless technology network, an IEEE 802.15x, or some other type of network. The techniques described herein may also be used for any combination of WWAN, WLAN and/or WPAN.

In some embodiments, and as further depicted in FIG. 1, the mobile device 130 may also be configured to at least receive information from a Satellite Positioning System (SPS) 102a-b, which may be used as an independent source of position information for the mobile device 130. The mobile device 130 may thus include one or more dedicated SPS receivers configured to receive signals for deriving device geo-location information from the SPS satellites. In embodiments in which the mobile device 130 can receive satellite signals, the mobile device may utilize a receiver (e.g., a GNSS receiver) specifically implemented for use with the SPS to extract position data from a plurality of signals transmitted by at least the SPS satellites 102a-b. Transmitted satellite signals may include, for example, signals marked with a repeating pseudo-random noise (PN) code of a set number of chips and may be located on ground based control stations, user equipment and/or space vehicles. The techniques provided herein may be applied to, or otherwise implemented, for use in various other systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with, or otherwise enabled, for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

As further shown in FIG. 1, the system 100 may further include a server 110 (e.g., a location server, such as an Evolved Serving Mobile Location Center (E-SMLC) server, or any other type of server) configured to communicate, via a network 112 (e.g., a cellular wireless network, a WiFi network, a packet-based private or public network, such as the public Internet), or via wireless transceivers included with the server 110, with multiple network elements or nodes, and/or mobile wireless devices. For example, the server 110 may be configured to establish communication links with one or more of the WLAN nodes, such as the access points 106a-d, which may be part of the network 112, to communicate data and/or control signals to those access points, and receive data and/or control signals from the access points. Each of the access points 106a-d can, in turn, establish communication links with mobile devices located within range of the respective access points 106a-d. The server 110 may also be configured to establish communication links (directly via a wireless transceiver(s), or indirectly, via a network connection) with one or more of the WWAN nodes, such as the WWAN access points 104a-c depicted in FIG. 1, which may also be part of the network 112, and/or to establish communication links with mobile wireless devices (such as the device 130), the light devices 120a-b, etc. The server 110 may also be configured to at least receive information from satellite vehicles 102a and/or 102b of a Satellite Positioning System (SPS), which may be used as an independent source of position information. In some embodiments, the server 110 may be part of, attached to, or reachable from network 112, and may communicate with the mobile wireless device 130, or with any other device or node depicted in FIG. 1, including the light devices 120a-b, directly or via some network.

Figure 2:
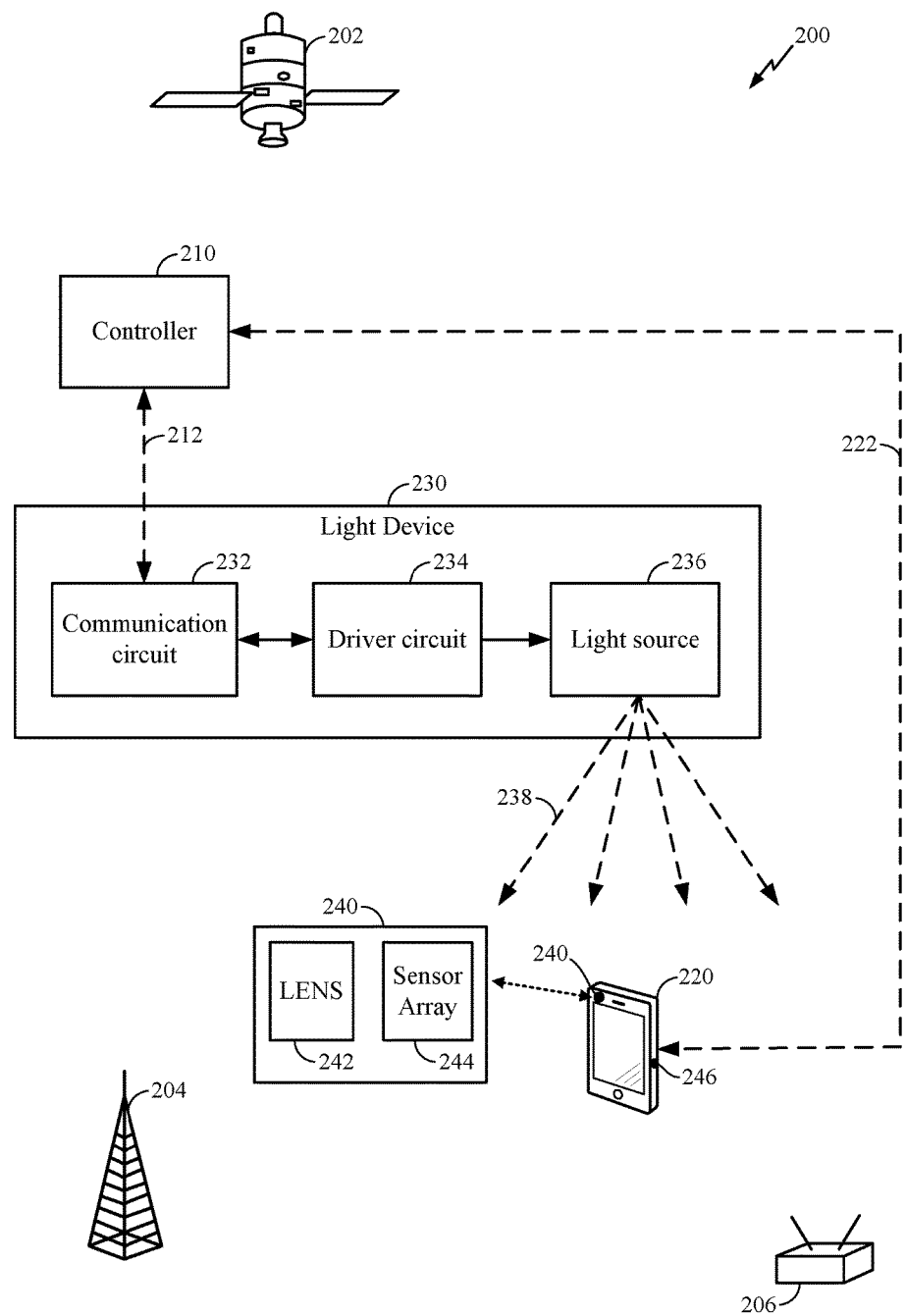
FIG. 2 is a schematic diagram of a light-based communication system.

With reference to FIG. 2, a schematic diagram of an example system 200 that can be used to transmit light-based communications (such as VLC signals) is shown. The light-based communication system 200 includes a controller 210 configured to control the operation/functionality of a light device 230 (also referred to as a "light fixture" or a "light source"). The light device 230 (optionally in conjunction with the controller 210) may be similar, in configuration and/or functionality, to the light devices 120a-b schematically depicted in FIG. 1. The system 200 further includes a mobile device 220, which may be similar to, in configuration and/or functionality, the mobile device 130 of FIG. 1, and is configured to receive and capture light emissions from a light source of the light device 230 (e.g., using one or more light-capture devices or sensors, which may be part of a light-based communication receiver module 512 depicted in FIG. 5), and to decode data encoded in the emitted light from the light device 230. Light emitted by a light source 236 of the light device 230 may be controllably modulated to include sequences of pulses (of fixed or variable durations) corresponding to codewords to be encoded into the emitted light. In some embodiments, visible pulses for codeword frames emitted by the light device 230 are captured by one or more of light-capture devices 240 and 246, and/or other light capture devices (each of which may include at least one lens and a sensor array) of the mobile device 220, and are decoded (e.g., by identifying from the captured at least part of the at least one image a signal (in time-domain and/or frequency domain representations) representative of one or more symbols comprising a visual light communication (VLC) codeword encoded in the VLC signal, and determining, at least in part, the VLC codeword from the signal identified from the captured at least part of the at least one image).

In some embodiments, the light-based communication system 200 may include any number of controllers such as the controller 210, mobile devices, such as the mobile device 220, and/or light devices, such as the light device (fixture) 230. In some embodiments the mobile device 220 may communicate directly with the light device 230. In some embodiments, the system 200 may be constituted similarly (in configuration and/or functionality) to the environment 100 of FIG. 1.

As further shown in FIG. 2, the light device 230 includes, in some embodiments, a communication circuit 232 to communicate with, for example, the controller 210 (via a link or channel 212, which may be a WiFi link, a link established over a power line, a LAN-based link, etc.), a driver circuit 234, and/or a light source 236. The communication circuit 232 may include one or more transceivers, implemented according to any one or more of communication technologies and protocols, including IEEE 802.11 (WiFI) protocols, near field technologies (e.g., Bluetooth® wireless technology network, ZigBee, etc.), cellular WWAN technologies, etc., and may also be part of a network (a local area network (LAN), a wireless LAN (WLAN), a wide area network (WAN), a wireless WAN (WWAN), etc.) assigned with a unique network address (e.g., an IP address). The communication circuit 232 may be implemented to provide wired communication, and may thus be connected to the controller 210 via a physical communication link. The controller 210 may in turn be a network node in a communication network to enable network-wide communication to and from the light device/fixture 230. In some implementations, the controller may be realized as part of the communication circuit 232. The controller may be configured to set/reset the codeword at each of the light fixtures. A light device/fixture may have a sequence of codewords, and the controller may be configured to provide a control signal to cause the light fixture to cycle through its list of codewords. Alternatively and/or additionally, in some embodiments, light fixtures may be addressable so that a controller (such as the controller 210 of FIG. 2) may access a particular light device/fixture to provide instructions, new code words, light intensity, frequency, and other parameters for any given fixture.

In some examples, the light source 236 may include one or more light emitting diodes (LEDs) and/or other light emitting elements. In some configurations, a single light source or a commonly controlled group of light emitting elements may be provided (e.g., a single light source, such as the light source 236 of FIG. 2, or a commonly controlled group of light emitting elements may be used for ambient illumination and light-based communication transmissions). In other configurations, the light source 236 may be replaced with multiple light sources or separately controlled groups of light emitting elements (e.g., a first light source may be used for ambient illumination, and a second light source may be used to implement coded light-based communication such as VLC signal transmissions).

The driver circuit 234 (e.g., an intelligent ballast) may be configured to drive the light source 236. For example, the driver circuit 234 may be configured to drive the light source 236 using a current signal and/or a voltage signal to cause the light source to emit light modulated to encode information representative of a codeword (or other data) that the light source 236 is to communicate. As such, the driver circuit may be configured to output electrical power according to a pattern that would cause the light source to controllably emit light modulated with a desired codeword (e.g., an identifier). In some implementations, some of the functionality of the driver circuit 234 may be implemented at the controller 210.

By way of example, the controller 210 may be implemented as a processor-based system (e.g., a desktop computer, server, portable computing device or wall-mounted control pad). As noted, at least some of the functionality of the controller 210 may be provided by the mobile device 220. For example, controlling signals to control the driver circuit 234 may be communicated from the mobile device 220 to the controller 210 via, for example, a wireless communication link/channel 222, and the transmitted controlling signals may then be forwarded to the driver circuit 234 via the communication circuit 232 of the fixture 230. In some embodiments, the controller 210 may also be implemented as a switch, such as an ON/OFF/dimming switch. A user may control performance attributes/characteristics for the light fixture 230, e.g., an illumination factor specified as, for example, a percentage of dimness, via the controller 210, which illumination factor may be provided by the controller 210 to the light fixture 230. In some examples, the controller 210 may provide the illumination factor to the communication circuit 232 of the light device 230. By way of example, the illumination factor, or other controlling parameters for the performance behavior of the light fixture and/or communications parameters, timing, identification and/or behavior, may be provided to the communication circuit 232 over a power line network, a wireless local area network (WLAN; e.g., a Wi-Fi network), a wireless wide area network (WWAN; e.g., a cellular network such as a Long Term Evolution (LTE) or LTE-Advanced (LTE-A) network), and/or via a wired network.

In some embodiments, the controller 210 may also provide the light device/fixture 230 with a codeword (e.g., an identifier) for repeated transmission using VLC. The controller 210 may also be configured to receive status information from the light device 230. The status information may include, for example, a light intensity of the light source 236, a thermal performance of the light source 236, and/or the codeword (or identifying information) assigned to the light fixture 230.

The mobile device 220 may be implemented, for example, as a mobile phone or tablet computer, and may be configured to communicate over different access networks, such as other WLANs and/or WWANs and/or personal area networks (PANs). The mobile device may communicate unidirectionally or bi-directionally with the controller 210, and/or with other devices and nodes in the system. As noted, the mobile device 220 may also communicate directly with the light device 230.

When the light device 230 is in an ON state, the light source 236 may provide ambient illumination 238 which may be captured by, for example, one or more of the light-capture devices 240 and 246 disposed on the device 220 (the mobile device may additional light-capture devices, such as a camera disposed on a rear surface, not shown, of the mobile device). Each such light-capture device of the device 220 may include a camera such as a CMOS camera, a charge-couple device (CCD)-type camera, etc. In some embodiments, the camera may be implemented with a rolling shutter mechanism configured to capture image data from a scene over some time period by scanning the scene vertically or horizontally so that different areas of the captured image correspond to different time instances. The light source 236 may also emit light-based communication transmissions that may be captured by any one of the various light-capture devices. The illumination and/or light-based communication transmissions may be used by the mobile device 220 for navigation and/or other purposes.

More particularly, as schematically depicted in FIG. 2, the light-capture device 240 (which may be a fixed-focus or a variable-focus device) may include at least one lens 242 to optically filter/process incoming light. The optically processed light is detected by a sensor array 244 that converts the optical signal into digital signal constituting the captured image. The detector (sensor array) 244 may include one or more of a complementary metal oxide semiconductor (CMOS) detector device, a charged coupled device (CCD), or some other device configured to convert an optical signal into digital data. The sensor array includes an array of pixels (or cells) that can each be controlled (e.g., programmably controlled) to activate or de-activate those pixels individually. Other light-capture devices of the mobile device 220 may be similarly implemented. The resultant digital image(s) may then be processed by a processor (e.g., one forming part of the light-capture device 240 of the device 220, or one that is part of the mobile device and is electrically coupled to the sensor array 244 of the light-capture device 240) to detect/identify the light sources emitting modulated light, decode the coded data included in the modulated light emitted from the light sources detected within the captured image(s), and/or perform other operations on the resultant image.

As further shown in FIG. 2, the light-based communication system 200 may be configured for communication with one or more different types of wireless communication systems or nodes. Such nodes, also referred to as wireless access points (or WAPs) may include LAN and/or WAN wireless transceivers, including, for example, WiFi base stations, femto cell transceivers, Bluetooth® wireless technology transceivers, cellular base stations, WiMax transceivers, etc. Thus, for example, one or more Local Area Network Wireless Access Points (LAN-WAPs), such as a LAN-WAP 206, which may be similar, in configuration and/or functionality, to any of the LAN-WAP's 106a-d of FIG. 1, may be used to provide wireless voice and/or data communication with the mobile device 220 and/or the light device 230 (e.g., via the controller 210). The light-based communication system 200 may also be configured for communication with one or more Wide Area Network Wireless Access Points, such as a WAN-WAP 204, which may be similar to, in configuration, and/or functionality, to any of the WAN-WAP 104a-c depicted in FIG. 1, and may be used for wireless voice and/or data communication, and may also serve as another source of independent information through which the mobile device 220, for example, may determine its position/location. In some embodiments, any of the controller 210, the mobile device 220, and/or the light device/fixture 230 may also be configured to at least receive information from a Satellite Positioning System (SPS) that includes a satellite 202, which may be similar to, in configuration and/or functionality, to any of the satellites 102a-b of FIG. 1, and which may be used as an independent source of position information for the mobile device 220 (and/or for the controller 210 or the fixture 230).

As noted, in some embodiments, position information may be derived based on data determined from decoding light-based communications provided by the light device 230 (through emissions from light sources such as the light source 236). The mobile device may be configured to determine mobile device data (e.g., the mobile device's orientation and/or motion), and determine predicted one or more pixels/cells of the sensor array (such as the sensor array/detector 244 depicted in FIG. 2) in order to controllably select/activate the predicted one or more pixels. In addition to mobile device data (also referred to as physical state data), other information may aid the determination (and subsequent activation) of specific pixels of the sensor array, including available location information (e.g., coarse location information, which may have been obtained from received RF signals) for the mobile device, location information for light devices in the vicinity of the mobile device, light-signal levels (resulting from emissions from light fixtures) detected/sensed by the mobile device, mobile device usage (e.g., whether the mobile device is receiving an incoming call that the user of the device is going to respond to, or is originating a call), etc. Light captured by the activated pixels can then be used to determine the location through a process of detecting and decoding light signals encoded into the light emissions from the various light devices detected. Light-based communications may also provide other types of data content.

Figure 3:
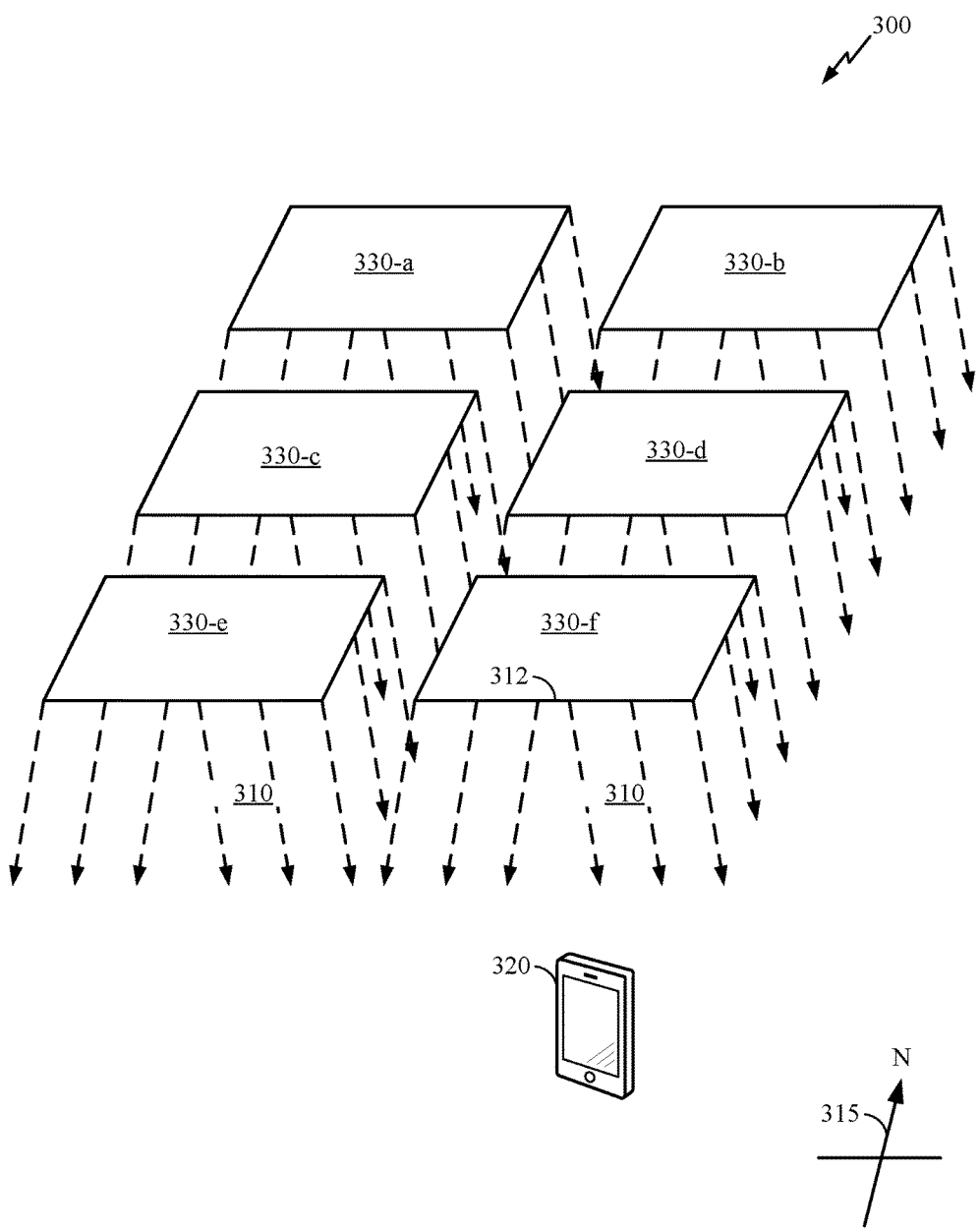
FIG. 3 is a diagram of an embodiment of a light-based communication system with multiple light devices.

With reference now to FIG. 3, a diagram of an example light-based communication system 300 is shown. The system 300 includes a mobile device 320 (which may be similar in configuration and/or functionality to the mobile devices 130 or 220 of FIGS. 1 and 2) positioned near (e.g., below) a number of light devices/fixtures 330-a, 330-b, 330-c, 330-d, 330-e, and 330-f. The light devices 330-a, 330-b, 330-c, 330-d, 330-e, and 330-f may, in some cases, be examples of aspects of the light device 120a-b and/or the light device 230 described with reference to FIGS. 1 and 2. The light devices 330-a, 330-b, 330-c, 330-d, 330-e, and 330-f may, in some examples, be overhead light devices/fixtures in a building (or overhead street/area lighting out of doors), which may have fixed locations with respect to a reference (e.g., a global positioning system (GPS) coordinate system and/or building floor plan). In some embodiments, the light devices 330-a, 330-b, 330-c, 330-d, 330-e, and 330-f may also have fixed orientations with respect to a reference (e.g., a meridian passing through magnetic north 315).

As the mobile device 320 moves (or is moved) under one or more of the light devices/fixtures 330-a, 330-b, 330-c, 330-d, 330-e, and 330-f, one or more light-capture devices of the mobile device 320 (which may be similar to the light-capture device 240 of FIG. 2) may receive light 310 emitted by one or more of the light fixtures 330-a, 330-b, 330-c, 330-d, 330-e, and 330-f and capture an image of part or all of one or more of the light fixtures 330-a, 330-b, 330-c, 330-d, 330-e, and 330-f. Alternatively or additionally, the mobile device 320 may receive, from one or more of the light devices 330-a, 330-b, 330-c, 330-d, 330-e, and 330-f, light-based communication (e.g., VLC signals) transmissions that include codewords (comprising symbols), such as identifiers, of one or more of the light fixtures 330-a, 330-b, 330-c, 330-d, 330-e, and/or 330-f. The received codewords may be used to generally determine a location of the mobile device 320 with respect to the light devices 330-a, 330-b, 330-c, 330-d, 330-e, and 330-f, and/or to look up locations of one or more of the light devices 330-a, 330-b, 330-c, 330-d, 330-e, and 330-f and determine, for example, a location of the mobile device 320 with respect to a coordinate system and/or building floor plan. In some implementations, location determination may be based on determined angles-of-arrival of light signals from various ones of the light devices, and based further on the locations of the light devices associated with the codewords/identifiers decoded from light signals those light devices transmit. Additionally or alternatively, the mobile device 320 may use the locations of one or more of the light fixtures 330-a, 330-b, 330-c, 330-d, 330-e, and 330-f, along with captured images (and known or measured dimensions and/or captured images of features, such as corners or edges) of the light devices 330-a, 330-b, 330-c, 330-d, 330-e, and 330-f, to determine a more precise location and/or orientation of the mobile device 320. Upon determining the location of the mobile device 320, the location may be used for navigation by the mobile device 320. Alternatively and/or additionally, the captured image(s) may include an illuminated reference axis, such as the illuminated edge 312 of the light fixture 330-f. Such illuminated edges may facilitate the mobile device to determine its location and/or orientation with reference to one or more of the light devices 330-a, 330-b, 330-c, 330-d, 330-e, and 330-f.

Figure 4:
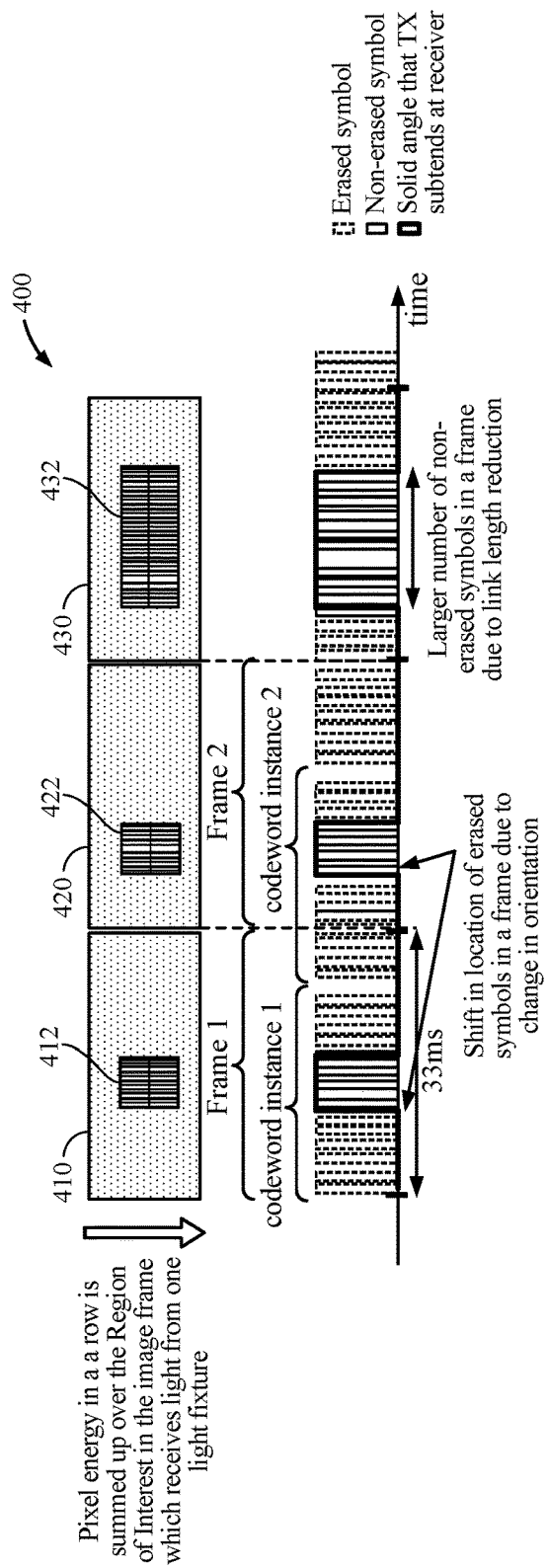
FIG. 4 is a diagram illustrating captured images, over three separate frames, of a scene that includes a light device emitting a coded light-based message.

As noted, a receiving device (e.g., a mobile phone, such as the devices 130, 220, or 320 of FIGS. 1-3, or some other mobile device) uses its light-capture device(s), which may be equipped with a gradual-exposure module(s)/circuit(s) (e.g., a rolling shutter) to capture a portion of, or all of, a transmission frame of the light source (during which part of, or all of, a codeword the light source is configured to communicate is transmitted). A light-capture device employing a rolling shutter, or another type of gradual-exposure mechanism, captures an image (or part of an image) over some predetermined time interval such that different rows in the frame are captured at different times, with the time associated with the first row of the image and the time associated with the last row of the image defining a frame period. In embodiments in which the mobile device is not stationary, the portion of a captured image corresponding to the light emitted from the light source will generally vary. For example, with reference to FIG. 4, a diagram 400 illustrating captured images, over three separate frames, of a scene that includes a light device emitting a light-based communication (e.g., a VLC signal), is shown. Because the receiving device's spatial relationship relative to the light source varies over the three frames (e.g., because the device's distance to the light source is changing, and/or because the device's orientation relative to the light source is changing, etc.), the region of interest in each captured image will also vary. In the example of FIG. 4, variation in the size and position of the region of interest in each of the illustrated captured frames may be due to a change in the orientation of the receiving device's light-capture device relative to the light source (the light source/device is generally stationary). Thus, for example, in a first captured frame 410 the light-capture device of the receiving device is at a first orientation (e.g., angle and distance) relative to the light source so that the light-capture device can capture a region of interest, corresponding to the light source, with first dimensions 412 (e.g., size and/or position). At a subsequent time interval, corresponding to a second transmission frame for the light source (during which the same codeword may be communicated), the receiving device has changed its orientation relative to the light source, and, consequently, the receiving device's light-capture device captures a second image frame 420 in which the region of interest corresponding to the light source has second dimensions 422 (e.g., size and/or a position) different from the first dimensions of the region of interest in the first frame 410. During a third time interval, in which the receiving device may again have changed its orientation relative to the light source, a third image frame 430, that includes a region of interest corresponding to the light source, is captured, with the region of interest including third dimensions 432 that are different (e.g., due to the change in orientation of the receiving device and its light-capture device relative to the light source) from the second dimensions. Because the region of interest changes over time, only a changing portion of the sensor array may be used over that time. Consequently, only those pixels in the approximate, changing, region of interest need to be activate in order to receive the light signals required to decode the data in the light signal. Pixels outside the region of interest (that do not receive light-based signals transmitted from light device viewed by the light-capture device) may be in an OFF state (if a pixel was previously in an ON state, it may need to be controllably de-activated) in order to preserve power. The pixels that are activated may deviate from the determined (or expected) region of interest to allow for some error tolerance.

Figure 5:
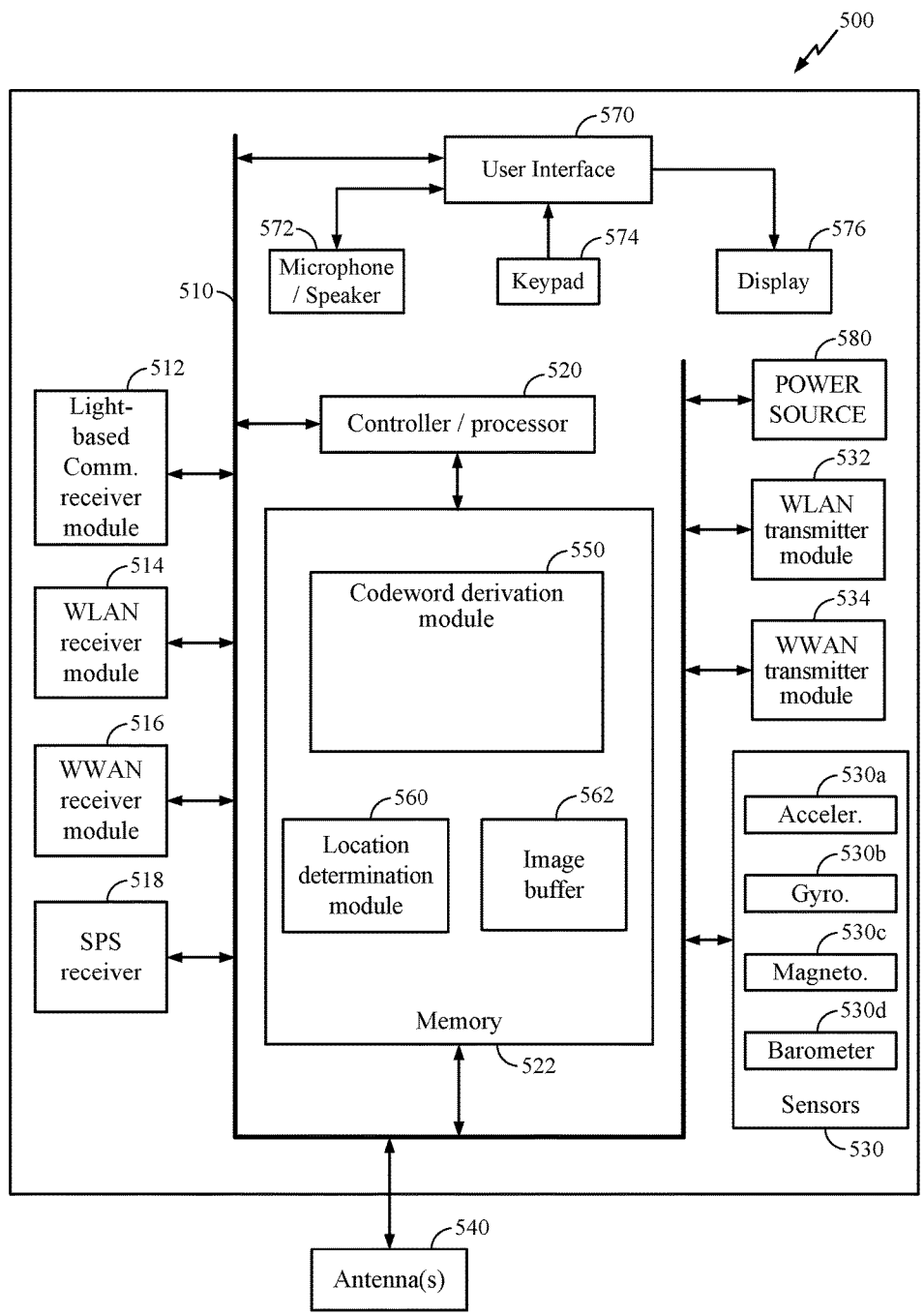
FIG. 5 is a block diagram of a mobile device configured to selectively activate pixels of one or more light-capture devices of the mobile device.

With reference now to FIG. 5, a block diagram of an example device 500 (e.g., a mobile device, such as a cellular phone, that includes multiple cameras) configured to selectively activate one or more pixels of one or more light-capture devices (e.g., cameras) of the device to improve detection of light-based signals and power utilization, so as to facilitate, for example, location determination operations, is shown. The device 500 may be similar in implementation and/or functionality to the devices 130, 220 or 320 of FIGS. 1-3. For the sake of simplicity, the various features/components/functions illustrated in the schematic boxes of FIG. 5 are connected together using a common bus 510 to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 5 may be further subdivided, or two or more of the features or functions illustrated in FIG. 5 may be combined. Additionally, one or more of the features, components, or functions illustrated in FIG. 5 may be excluded. In some embodiments, some or all of the components depicted in FIG. 5 may also be used in implementations of one or more of the light devices (e.g. the devices 120a-b of FIG. 1, the device 230 with or without the controller 210 depicted in FIG. 2), or may be used with any other device or node described herein.

As noted, in some embodiments, an assigned codeword, encoded into repeating light-based communications transmitted (e.g., through repeated periodical communications) by a light device (e.g., via the light source 236 of the light device 230 of FIG. 2) may include, for example, an identifier codeword to identify the light device (the light device may be associated with location information, and thus, identifying the light device may facilitate position determination for the receiving device) or may include other types of information (which may be encoded using other types of encoding schemes). As shown, in some implementations, the device 500 may include receiver modules, a controller/processor module 520 to execute application modules (e.g., software-implemented modules stored in a memory storage device 522), and/or transmitter modules. Each of these components may be in communication (e.g., electrical communication) with each other. The components/units/modules of the device 500 may, individually or collectively, be implemented using one or more application-specific integrated circuits (ASICs) adapted to perform some or all of the applicable functions in hardware. Alternatively and/or additionally, functions of the device 500 may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs). The functions of each unit may also be implemented, in whole or in part, with instructions embodied in a memory, formatted to be executed by one or more general or application-specific processors. The device 500 may have any of various configurations, and may in some cases be, or include, a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift, a vacuum cleaner, a car, etc.), and so on. In some embodiments, the device 500 may include a power source/supply 580, such as a battery or a power conversion unit to convert external power to the power levels required by the device 500.

Figure 9:
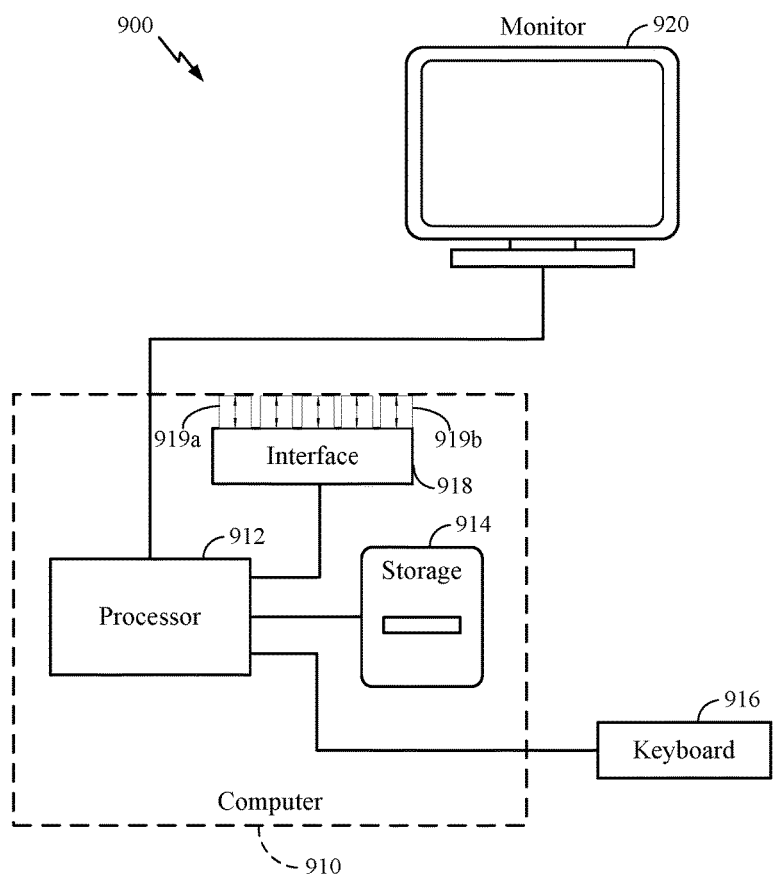
FIG. 9 is a schematic diagram of a computing system.

Further details about an example implementation of a processor-based device which may be used to realize, at least in part, the system 900, is provided below with respect to FIG. 9.

As further shown in FIG. 5, the receiver modules may include a light-based communication receiver module 512, which may include one or more light-capture devices similar to the light-capture devices 132 and 134 of FIG. 1, or the light-capture devices 240 and 246 of FIG. 2, configured to receive a light-based communication such as a VLC signal (e.g., from a light source such as the light source 236 of FIG. 2, or from light sources of any of the light devices 120a-b or 330-a-f depicted in FIGS. 1 and 3). As discussed, the various light captured devices of the device 500 may be disposed on any of the different surfaces and locations of the housing of the mobile device (e.g., front-surface, rear-surface, any of side-surfaces of a device such as the mobile devices 130 and 220 of FIGS. 1 and 2). The light-based communication receiver module 512 may also include a photo detector (PD) or array of PDs, e.g., a complementary metal-oxide-semiconductor (CMOS) image sensor (e.g., camera), a charge couple device, or some other sensor-based camera. The light-based communication receiver module 512 may be implemented as a gradual-exposure light-capture device, e.g., a rolling shutter image sensor. In such embodiments, the image sensor captures an image over some predetermined time interval such that different rows in the frame are captured at different times. The light-based communication receiver module 512 may be used to receive, for example, one or more VLC signals in which one or more identifiers, or other information, are encoded. An image captured by the light-based communication receiver module 512 may be stored in a buffer such as an image buffer 562 which may be a part of a memory storage device 522 schematically illustrated in FIG. 5.

Additional receiver modules/circuits that may be used instead of, or in addition to, the light-based communication receiver module 512 may include one or more radio frequency (RF) receiver modules/circuits/controllers that are connected to one or more antennas 540. As noted, RF signals received and measured through such RF modules may facilitate position determination which may be used to estimate positioning of the mobile device. For example, the RF signals may be used to obtain a coarse position, which can be used to facilitate, for example, selecting/activating pixels (of any of the light-capture devices) predicted to receive light-based communications from light devices located within the area corresponding to the determined coarse position. In some embodiments, the device 500 may include a wireless local area network (WLAN) receiver module 514 configured to enable, for example, communication according to IEEE 802.11x (e.g., a WiFi receiver). In some embodiments, the WLAN receiver 514 may be configured to communicate with other types of local area networks, personal area networks (e.g., Bluetooth® wireless technology networks, or other types of near-field networks), etc. Other types of wireless networking technologies may also be used including, for example, Ultra Wide Band, ZigBee, wireless USB, etc. In some embodiments, the device 500 may also include a wireless wide area network (WWAN) receiver module 516 comprising suitable devices, hardware, and/or software for communicating with and/or detecting signals from one or more of, for example, WWAN access points and/or directly with other wireless devices within a network. In some implementations, the WWAN receiver may comprise a CDMA communication system suitable for communicating with a CDMA network of wireless base stations. In some implementations, the WWAN receiver module 516 may facilitate communication with other types of cellular telephony networks, such as, for example, TDMA, GSM, WCDMA, LTE, etc. Additionally, any other type of wireless networking technologies may be used, including, for example, WiMax (802.16), etc. In some embodiments, an SPS receiver 518 (also referred to as a global navigation satellite system (GNSS) receiver) may also be included with the device 500. The SPS receiver 518, as well as the WLAN receiver module 514 and the WWAN receiver module 516, may be connected to the one or more antennas 540 for receiving RF signals. The SPS receiver 518 may comprise any suitable hardware and/or software for receiving and processing SPS signals. The SPS receiver 518 may request information as appropriate from other systems, and may perform computations necessary to determine the position of the mobile device 500 using, in part, measurements obtained through any suitable SPS procedure.

In some embodiments, the device 500 may also include one or more sensors 530 such as an accelerometer 530a, a gyroscope 530b, a geomagnetic (magnetometer) sensor (e.g., a compass) 530c, any of which may be implemented based on micro-electro-mechanical-system (MEMS), or based on some other technology. Directional sensors such as accelerometers and/or magnetometers may, in some embodiments, be used to determine the device orientation relative to a light fixture(s), and/or be used to controllably select and activate pixels of one or more light-capture devices (e.g., of the light-based communication receiver module 512) that are predicted to receive light-based communications from light devices viewable by the light-capture device. Additionally, such sensors may be used, in some embodiments, to obtain an exact or approximate measure of speed/velocity and/or distance traveled by the mobile device between two locations, based on which subsequent predicted selection/activation of the one or more of the multiple light-capture devices may be performed. Other sensors that may be included with the device 500 may include an altimeter (e.g., a barometric pressure altimeter 530d), a thermometer (e.g., a thermistor; not shown), an audio sensor (e.g., a microphone; not shown) and/or other sensors. The output of the sensors may be provided as part of the data based on which operations, such as location determination and/or navigation operations, may be performed.

In some examples, the device 500 may include one or more RF transmitter modules connected to the antennas 540, and may include one or more of, for example, a WLAN transmitter module 532 (e.g., a Wi-Fi transmitter module, a Bluetooth® wireless technology networks transmitter module, and/or a transmitter module to enable communication with any other type of local or near-field networking environment), a WWAN transmitter module 534 (e.g., a cellular transmitter module such as an LTE/LTE-A transmitter module), etc. The WLAN transmitter module 532 and/or the WWAN transmitter module 534 may be used to transmit, for example, various types of data and/or control signals (e.g., to the controller 210 connected to the light device 230 of FIG. 2) over one or more communication links of a wireless communication system. In some embodiments, the transmitter modules and receiver modules may be implemented as part of the same module (e.g., a transceiver module), while in some embodiments the transmitter modules and the receiver modules may each be implemented as dedicated independent modules.

The controller/processor module 520 is configured to manage various functions and operations related to light-based communication and/or RF communication, including decoding light-based communications, such as VLC signals. As shown, in some embodiments, the controller 520 may be in communication (e.g., directly or via the bus 510) with the memory storage device 522 which includes a codeword derivation module 550. As illustrated in FIG. 5, an image captured by any of the light-capture devices (e.g., of the light-based communication receiver module 512 of FIG. 5) may be stored in the image buffer 562, and processing operations performed by the codeword derivation module 550 may be performed on the data of the captured image stored in the image buffer 562. In some embodiments, codeword derivation module 550 may be implemented as a hardware realization, a software realization (e.g., as processor-executable code stored on non-transitory storage medium such as volatile or non-volatile memory, which in FIG. 5 is depicted as the memory storage device 522), or as a hybrid hardware-software realization. The controller 520 may be implemented as a general processor-based realization, or as a customized processor realization, to execute the instructions stored on the memory storage device 522. In some embodiments, the controller 520 may be realized as an apps processor, a DSP processor, a modem processor, dedicated hardware logic, or any combination thereof. Where implemented, at least in part, based on software, each of the modules, depicted in FIG. 5 as being stored on the memory storage device 522, may be stored on a separate RAM memory module, a ROM memory module, an EEPROM memory module, a CD-ROM, a FLASH memory module, a Subscriber Identity Module (SIM) memory, or any other type of memory/storage device, implemented through any appropriate technology. The memory storage device 522 may also be implemented directly in hardware.

In some embodiments, the controller/processor 520 may also include a location determination engine/module 560 to determine a location of the device 500 or a location of a device that transmitted a light-based communication (e.g., a location of a light source such as the light source 236 and/or the light device 230 depicted in FIG. 2) based, for example, on a codeword (identifier) encoded in a light-based communication transmitted by the light source. For example, in such embodiments, each of the codewords of a codebook may be associated with a corresponding location (provided through data records, which may be maintained at a remote server, or be downloaded to the device 500, associating codewords with locations). In some examples, the location determination module 560 may be used to determine the locations of a plurality of devices (light sources and/or their respective fixtures) that transmit light-based communications, and determine the location of the device 500 based at least in part on the determined locations of the plurality of devices. In some implementations, the location determination module 560 may obtain position information from various other receivers and modules of the mobile device 500, e.g., based on receive signal strength indication (RSSI) and round trip time (RTT) measurements performed using, for example, the radio frequency receiver and transmitter modules of the device 500, as well as based on angle of arrival of RF signals at the receiving device.

Figure 6A:
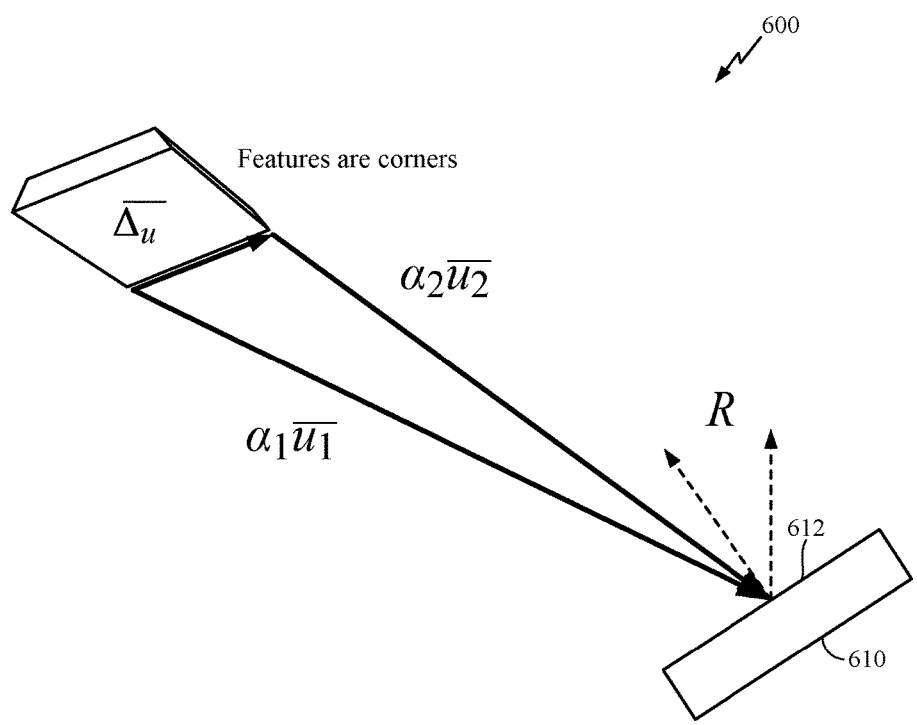
FIG. 6A is a diagram of a system to determine position of a device.
Figure 6B:
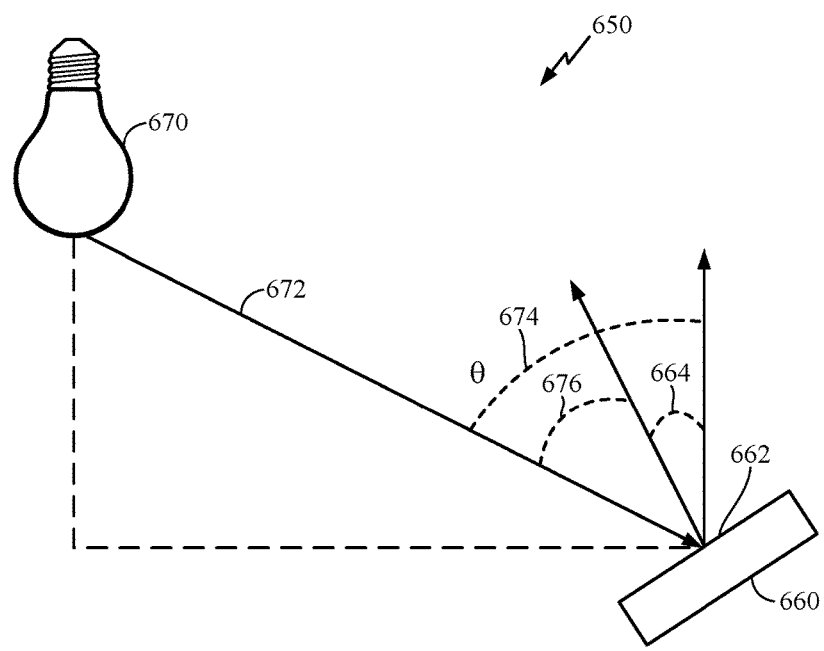
FIG. 6B is a diagram of a system to determine angle of arrival of a light signal.

Location determination based on light-based communications (based on codewords/identifiers decoded from such light-based communications) may be based on physical features such as corners/edges of a light device or fixture to thus achieve 'cm' level accuracy in determining the position of the mobile device (as more particularly discussed below in relation to FIG. 6A), and/or may be based on angle of arrival of the light-based signal (in which, as more particularly described in relation to FIG. 6B, the mobile device determines a position by making use of its camera to capture a light device's VLC signals, decode the light device ID, and measure the angle of arrival (AOA) of the VLC signal from that light device). In some embodiments, based on the angle of arrival of light-based signals, and using assistance data, the mobile device can obtain decoded light devices' ID's (and thus determine their positions) and determine its position (e.g., using trilateration techniques).

Thus, for example, and with reference to FIG. 6A showing a diagram of an example system 600 to determine position of a device 610 (e.g., a mobile device which may be similar to the mobile devices 130, 220, 320, or 500 of FIGS. 1, 2, 3, and 5, respectively) that includes a light-capture device 612 (which may be one of several light-capture devices of the device 610), consider a situation where an image is obtained from which two corners of a light source of the light device (e.g., a light device transmitting a light-based communication identifying that light device, with that light device being associated with a known position) are visible and are detected. In this situation, the direction of arrival of light rays corresponding to each of the identified corners of the light fixture are represented as a unit vector $u'_1$ and $u'_2$ in the device's coordinate system. In some embodiments, based on measurements from the mobile device's various sensors (e.g., measurements from an accelerometer, a gyroscope, a geomagnetic sensor, each of which may be part of the sensors 530 of the device 500 of FIG. 5), the tilt of the mobile device may be derived/measured, and based on that the rotation matrix R of the device's coordinate system around that of the earth may be derived. The position and orientation of the device may then be derived based on the known locations of the two identified features (e.g., corner features of the identified fixture) by solving for the parameters $\alpha_1$ and $\alpha_2$ in the relationship:

$$\alpha_1 u'_1 + \alpha_2 u'_2 = R^{-1} \Delta'_u,$$

where $\Delta'_u$ is the vector connecting the two known features. The determined location for the mobile device may include position coordinates (absolute or relative), and may also include an orientation value (e.g., the azimuth or elevation angle) of the light-capture device with respect to the light device that transmitted the light-based communication.

A location of the mobile device may also be derived based on an angle-of-arrival of a light signal (e.g., corresponding to a light-based communication). In such embodiments, a location approximation for the mobile device may be derived, for example, by using the mobile device's light-capture device(s) to capture VLC signals of light devices appearing in the capture scene(s), decoding the light devices' ID's, and measuring the angle of arrival (AOA) of the VLC signals from those light devices. Using assistance data, the mobile device (or a location server) can determine the positions of the light devices according to the VLC-decoded ID's, and compute (e.g., using a trilateration process) the mobile device's position. FIG. 6B shows a diagram of an example system 650 to determine an angle of arrival of a light signal and determine a position of a device 660 (e.g., a mobile device which may be similar to the mobile devices 130, 220, 320, 500, or 610 of FIGS. 1, 2, 3, 5, and 6A respectively) based on the determined angle-of-arrival.

More particularly, consider a situation where modulated light emitted from a light source 670 arrives at some angle θ (marked 674) relative to some external frame-of-reference (e.g., the earth's frame-of-reference). As shown in FIG. 6B, the device 660 is tilted in some undetermined angle relative to that external frame-of-reference. In some embodiments, determination of the angle of arrival of a light signal 672 from the light source 670 may include determining the relative angle of arrival of the signal 672 with respect to a coordinate system of the mobile device 660. The relative angle of arrival of the light signal 672 may be estimated, in some cases, by determining a position of an illuminated region captured by an image sensor (of a light-capture device 662) of the device 660 illuminated by the light source 670. The illuminated region may be defined as an array of pixels within the image sensor, and may in some cases be specified in terms of pixel indices. A centroid of the illuminated region (e.g., a location $(x_0, y_0)$), may be found relative to the image sensor's coordinate system, which may also be considered the coordinate system of the mobile device 660. The image sensor's coordinate system may be defined by a pair of axes centered at the midway pixel along the width and the length of the image sensor. For example, if the sensor is 480 pixels wide and 640 pixels long, then the coordinate axes are centered at the pixel index pair (240, 320). If the centroid of the identified region of the image is at pixel indices (250, 335) then the location of the region is given by $(x_0, y_0) = (10, 15)$. In general, if the pixel indices are $(p_x, p_y)$ and the center of the sensor is at pixel indices $(c_x, c_y)$, the location of the region is $(x_0, y_0) = (p_x, p_y) - (c_x, c_y)$. A pair of angles $(\omega_x, \omega_y)$ may then be determined as a function of the centroid $(x_0, y_0)$. This pair of angles determines the angle of arrival of the light signal 672 received by the mobile device 660 (i.e., by the light-capture device 662 of the device 660), expressed in terms of the coordinate system of the mobile device 660, which is a three dimensional coordinate system where the axis perpendicular to the plane that the mobile device lies in is the Z-axis, and the X and Y axes span the plane that the mobile device lies in and coincide with the image sensor's coordinate axes. For example, if the half of the field of view angle is denoted by $\theta_{half}$ and the screen resolution in pixels is denoted by $X_{res}$ by $Y_{res}$, then the mapping between the centroid $(x_0, y_0)$ and the relative angle of arrival $(\omega_x, \omega_y)$ of a light signal may be given by the equations:

$$\omega_x = \arctan\left(\frac{2x_0}{X_{res}} \tan(\theta_{half})\right)$$

$$\omega_y = \arctan\left(\frac{2y_0}{Y_{res}} \tan(\theta_{half})\right)$$

In some embodiments, measurements of an orientation of the mobile device 660 may be obtained from orientation sensors of the device 660 (e.g., a gyroscope, an accelerometer, etc., such as the various sensors 530*a-c* depicted in FIG. 5). Based on measurements obtained by the orientation sensors of the device 660, a pair of angles $(\theta_x, \theta_y)$ are derived which represent the angles of rotation (or orientation) of the mobile device 660 with respect to the reference (absolute) coordinate system. For example, if gyroscope or accelerometer sensors are used, the angles $(\theta_x, \theta_y)$ may represent the pitch and roll of the mobile device relative to the earth's coordinate system. The absolute angle of arrival (i.e., relative to the reference/external coordinate system) may thus be computed, in some cases, by adjusting the relative angle of arrival (marked with reference numeral 676) with the orientation angle as measured by a the orientation sensors of the device 660.

In some embodiments, the absolute angle of arrival may be determined by multiplying a unit vector, expressed relative to a coordinate system of the mobile device, by a rotation matrix to obtain a unit vector expressed relative to an absolute coordinate system (e.g., the earth's coordinate system). For example, a unit vector in the mobile device's coordinate system may be expressed as:

$$u_{device} = \frac{u_{device}}{|v|}$$

where $v = [\tan(\omega_x), \tan(\omega_y), 1]$, and $|v| = \tan(\omega_x)^2 + \tan(\omega_y)^2 + 1$. The unit vector, u, extends from the mobile device to the light source 670 expressed in the coordinate system of the mobile device, as defined above. From the unit vector (that is expressed in the coordinate system of the mobile device), a resultant unit vector that is expressed in an absolute coordinate system may be obtained. For example, the earth's coordinate system (an absolute coordinate system) may be defined by a Z axis that is parallel to the gravity vector, and X and Y axes that are in the plane of the earth's surface. The relative orientation of the X and Y axes in that plane may be arbitrary or be aligned with the earth's magnetic field. To convert the unit vector u from the coordinate system of the mobile device to the earth's coordinate system, the vector u may be multiplied by a rotation matrix. The rotation matrix may represent the rotation of the mobile device around some axis in the earth's coordinate system. For example, a rotation of the mobile device amounting to $\theta_x$ degrees around the Y axis of the earth's coordinate system (referred to as the roll) may be represented as:

$$R_Y(\theta_x) = \begin{bmatrix} 1 & 0 & 0 \\ 0 & \cos(\theta_x) & -\sin(\theta_x) \\ 0 & \sin(\theta_x) & \cos(\theta_x) \end{bmatrix}$$

The roll angle $\theta_x$ is illustrated in FIG. 6B as an angle 664. A rotation of $\theta_y$ degrees around the X axis of the earth's coordinate system (referred to as the pitch) may be represented as:

$$R_X(\theta_y) = \begin{bmatrix} \cos(\theta_y) & 0 & \sin(\theta_y) \\ 0 & 1 & 0 \\ -\sin(\theta_y) & 0 & \cos(\theta_y) \end{bmatrix}$$

The unit vector in the earth's coordinate system can then be expressed as:

$$u_{earth} = R_Y(\theta_x) R_X(\theta_y) u_{device}$$

Given the unit vector in the earth's coordinate system, $u_{earth}$, a vector from the light source 670 to the mobile device, $u_{earth}$, can be computed by scaling $u_{earth}$ so that the z-coordinate of the resulting vector is equal to the height of the light source from the mobile device. In other words, if $u_{earth}(z)$ is the z-coordinate of vector $u_{earth}$ and $d_z$ is the height, then the vector $u_{earth}$ may be written as:

$$v_{earth} = \frac{d_z u_{earth}}{u_{earth}(z)}$$

Thus, the position of the mobile device can be derived based on the computed angle of arrival of light signals (such as the signal 672) arriving from the light device/fixture 670, and the known position of the light source 670 (i.e., coordinates of the light source in the global frame of reference, such as the earth's global coordinate systems, including height of the light source). As noted, the light device's coordinates may be obtained based, in part, according to the decoded identifier derived from the data included in the modulated light signal received by the light-capture device 662 of the mobile device 660.

Turning back to FIG. 5, in some examples, the device 500 and/or the controller/processor module 520 may include a navigation module (not shown) that uses a determined location of the device 500 (e.g., as determined based on the known locations of one or more light sources/fixtures transmitting the VLC signals) to implement navigation functionality.

A light-based communication (such as a VLC signal) transmitted from a particular light source, is received by the light-based communication receiver module 512, which may include one or more image sensors with gradual-exposure mechanisms (e.g., a CMOS image sensor with a rolling shutter) configured to capture on a single frame time-dependent image data representative of a scene (a scene that includes one or more light devices transmitting light-based communications, such as VLC signals) over some predetermined interval (e.g., the captured scene may correspond to image data captured over 1/30 second), such that different rows contain image data from the same scene but for different times during the pre-determined interval. As further noted, the captured image data may be stored in an image buffer which may be realized as a dedicated memory module of the light-based communication receiver module 512, or may be realized on the memory 522 of the device 500. A portion of the captured image will correspond to data representative of the light-based communication transmitted by the particular light source (e.g., the light source 236 of FIG. 2, with the light source comprising, for example, one or more LEDs) in the scene, with a size of that portion based on, for example, the distance and orientation of the light-based communication receiver module to the light source in the scene. In some situations, the light-based communication may be captured at a low exposure setting of the light-based communication receiver module 512, so that high frequency pulses are not attenuated.

Having captured an image frame that includes time-dependent data from a scene including a particular light device (or multiple light devices), the codeword derivation module 550, for example, is configured to process the captured image frame to extract symbols encoded in the light-based communication occupying a portion of the captured image (as noted, the size of the portion will depend on the distance from the light device, and/or on the orientation of the light-based communication receiver module relative to the light device). The symbols extracted may represent at least a portion of the codeword (e.g., an identifier) encoded into the light-based communication, or may represent some other type of information. In some situations, the symbols extracted may include sequential (e.g., consecutive) symbols of the codeword, while in some situations the sequences of symbols may include at least two non-consecutive sub-sequences of the symbols from a single instance of the codeword, or may include symbol sub-sequences from two transmission frames (which may or may not be adjacent frames) of the light source (i.e., from separate instances of a repeating light-based communication).

As also illustrated in FIG. 5, the device 500 may further include a user interface 570 providing suitable interface systems, such as a microphone/speaker 572, a keypad 574, and a display 576 that allows user interaction with the device 500. The microphone/speaker 572 provides for voice communication services (e.g., using the wide area network and/or local area network receiver and transmitter modules). The keypad 574 may comprise suitable buttons for user input. The display 576 may include a suitable display, such as, for example, a backlit LCD display, and may further include a touch screen display for additional user input modes.

Figure 7A:
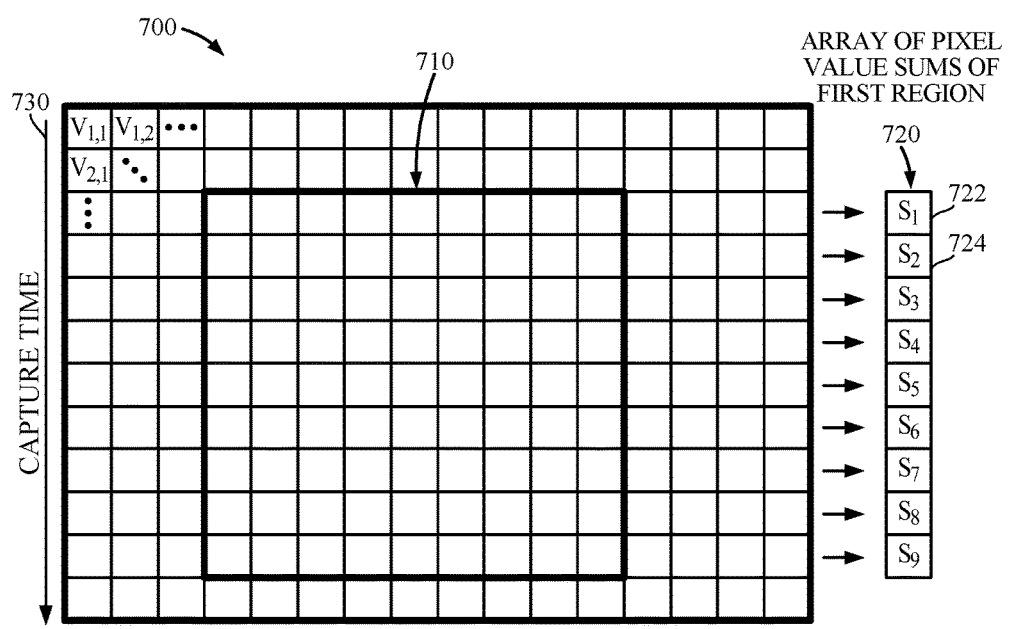
FIG. 7A is a diagram of an example sensor array that includes an active pixel region corresponding to a field of view for a light device viewable by the sensor array.

FIG. 7A is a diagram showing a diagram of an example sensor array 700 (also referred to as in image sensor), that includes a first region of active pixels 710 corresponding to received illumination (FOV) from a light device. In the example illustration of FIG. 7A, the sensor array captures an image using an array of 192 pixels which is represented by 12 rows and 16 columns. Other implementations may use any other sensor array size (e.g., 307,200 pixels, represented by 480 rows and 640 columns), depending on the desired resolution and on cost considerations. The first region of active pixels 710 may have been determined as a coarse field-of-view, based on which subsequent, predicted, fields-of-view can be determined. The first region 710 may itself be a predicted field-of-view derived based on mobile device data, such as measured orientation, displacement, usage, detected light levels, etc., and further derived based on an initial, coarse, FOV. In situations in which a coarse FOV is being determined, the first region 710 may be identified/detected using image processing techniques (e.g., edge detection processes) to identify areas in the captured image frame with particular characteristics, e.g., a rectangular or circular area with rows of pixels of substantially uniform values. In some embodiments, the first region 710 is identified based on comparing individual pixel values, e.g., an individual pixel luma value, to a threshold and identifying pixels with values which exceed the threshold, e.g., in a contiguous rectangular region in the image sensor. The threshold may be a relative threshold, e.g., 50%, 60%, or any other percentage value of the average luma value of the signal levels detected by the sensor array 700 (or of a portion of the image corresponding to active pixels). In some embodiments, the threshold may be dynamically adjusted, e.g., in response to a failure to identify a first region or a failure to successfully decode information being communicated by a light-based communication in the first region 710. An initial, coarse, FOV may be determined through a full or partial scan of a scene viewable by the light capture device (as will be discussed in greater detail below).

As further illustrated in FIG. 7A, to process and decode light signals detected by the active pixels of the sensor array 700, a first array 720 of pixel sum values is generated. Vertical axis 730 corresponds to capture time, and the rolling shutter implementation in the light-capture device results in different rows of pixels corresponding to different times. Each pixel in the sensor array 700 is configured to capture and generate a pixel value representing energy recovered corresponding to that pixel during exposure. For example, the pixel of row 1 and column 1 (when active) has a pixel value $V_{1,1}$. As noted, the first region 710 is an identified region of active pixels in which the light-based communication is determined to being received (or to likely being received) light signals during a particular first frame. The pixel sum values array 720 may be populated with values corresponding to sum of pixel values in each row of the first region of active pixels 710. Each element of the array 720 may correspond to a different row of the first region 710. For example, array element $S_1$ 722 represents the sum of pixel values (in the example image 700) of the first row of the first region 710 (which is the third row of the sensor array 700), and thus includes the value that is the sum of $V_{3,4}$, $V_{3,5}$, $V_{3,6}$, $V_{3,7}$, $V_{3,8}$, $V_{3,9}$, $V_{3,10}$, $V_{3,11}$, and $V_{3,12}$. Similarly, the array element $S_2$ 724 represents the sum of pixel values of the second row of the first region of active pixels 710 (which is row 4 of the sensor array 700) of $V_{4,4}$, $V_{4,5}$, $V_{4,6}$, $V_{4,7}$, $V_{4,8}$, $V_{4,9}$, $V_{4,10}$, $V_{4,11}$, and $V_{4,12}$.

Array element 722 and array element 724 generally correspond to different sample times as the rolling shutter advances. The first array 720 is used to recover a light-based communication (e.g., VLC signal) being communicated. In some embodiments, the VLC signal being communicated is a signal tone, e.g., one particular frequency in a set of predetermined alternative frequencies, during the first frame, and the single tone corresponds to a particular bit pattern in accordance with known predetermined tone-to-symbol mapping information. Decoded symbols encoded into a light-based communication captured by the light-capture device (and detected by the active pixels in the first region) may be determined based on, in some embodiments, on the computed values of the sum of pixel values (as provided by, for example, the first array 720 shown in FIG. 7A). For example, the computed sum values of each row of the region of interest may be compared to some threshold value, and in response to a determination that the sum value exceeds the threshold value (or that the sum is within some range of values), the particular row may be deemed to correspond to part of a pulse of a symbol. In some embodiments, the pulse's timing information, e.g., its duration (which, in some embodiments, would be associated with one of the symbols, and thus can be used to decode/identify the symbols from the captured images) may also be determined and recorded. A determination that a particular pulse has ended may be made if there is a drop (e.g., exceeding some threshold) in the pixel sum value from one row to another. Additionally, in some embodiments, a pulse may be determined to have ended only if there are a certain number of consecutive rows (e.g., 2, 3 or more), following a row with a pixel sum that indicates the row is part of a pulse, that are below a non-pulse threshold (that threshold may be different from the threshold, or value range, used to determine that a row is part of a pulse). The number of consecutive rows required to determine that the current pulse has ended may be based on the size of the first region of active pixels. For example, small regions of active pixels (in situations where the mobile device may be relatively far from the light source) may require fewer consecutive rows below the non-pulse threshold, than the number of rows required for a larger regions of active pixels, in order to determine that the current pulse in the light-based communication signal has ended. Having decoded one or more symbol sub-sequences for the particular codeword, in some embodiments, a codeword derivation module, such as the module 550 of FIG. 5, is applied to the one or more decoded symbols in order to determine/identify codewords. The decoding procedures implemented depend on the particular coding scheme used to encode data in the light-based communication.

Figure 7B:
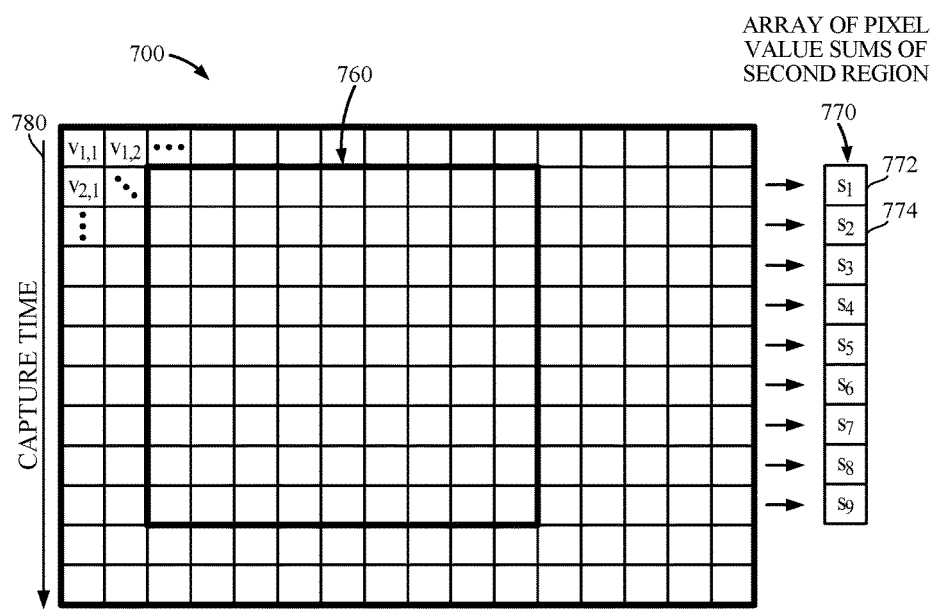
FIG. 7B is a diagram of the example sensor array of FIG. 7A at a subsequent time instance, in which an updated predicted region of active pixels of the sensor array is determined and selected.

With reference now to FIG. 7B, a diagram of the sensor array 700 at a later time (subsequent to the time instance of FIG. 7A) is shown. At the subsequent time corresponding to FIG. 7B, the mobile device may have moved a bit to the right and down (relative to the light device within a field of view corresponding to the first region of active pixels 710), thus causing the field-of-view corresponding to that light device to have shifted closer to the top left corner of the sensor array 700. As shown, at the subsequent time instance, the sensor array 700 includes a second, subsequent, region of active pixels 760 that receives light-based communication from the light device whose transmitted light-based communication was captured by the pixels of the first region 710. As described herein, the second region of active pixels 760 may correspond to a current field-of-view of a particular light device, where that FOV may have been determined based on a previous, coarse, field of view (which in this particular example, may be the field-of-view corresponding to the first region of active pixels 710 of FIG. 7A), and further based on mobile device data (e.g., orientation, motion, usage information, etc., for the mobile device). For example, as a result of a change in the measured orientation of the mobile device, a determination is made that the position of the mobile device has shifted (with respect to a previously viewable light device) such that the mobile device has moved a bit to the right and down, relative to the light device. This change in orientation would thus cause an image of the light device be closer to the top left corner of the sensor array 700, and accordingly, the predicted pixels that are likely to receive light signals from the same light device are those in the illustrated the second region 760 of FIG. 7B. In some embodiments, the size of the first region of active pixels 710 may be different than the size of the second region of active pixels 760 (because the mobile device may have moved farther or closer to the viewable light device).

In FIG. 7B, a vertical axis 780 corresponds to capture time, and the rolling shutter implementation in the camera results in different rows of pixels corresponding to different times. Each pixel in the second region of active pixels 760 may have a pixel value (when active) representing energy recovered corresponding to that pixel during exposure. For example, the pixel of row 1, column 1, has pixel value $v_{1,1}$. In some embodiments, an array 770 of pixel value sums for the second region of active pixels 760 is maintained. Each element of the array 770 corresponds to a different row of the second region 760. Processing and decoding of received and captured light-based signals may be performed similarly to the operations described in relation to FIG. 7B.

Figure 8:
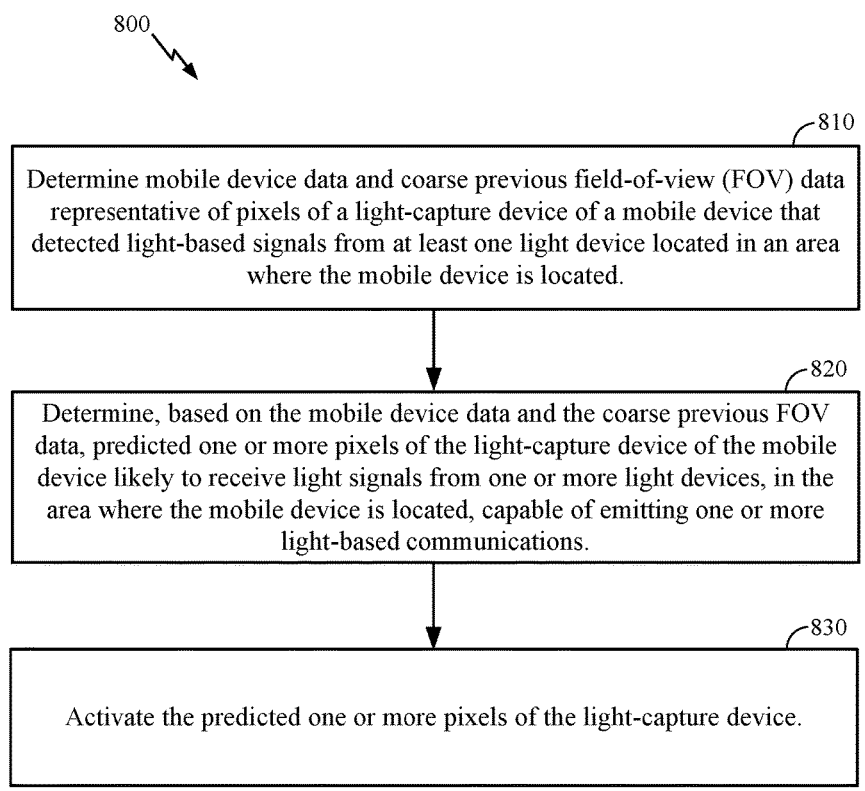
FIG. 8 is a flowchart of an example procedure to selectively activate pixels of a light capture device.

As described herein, one way to optimize power utilization by a mobile device is to control which pixels of a light sensor array of a light-capture device of the device are to be activated (e.g., to restrict the activated pixels to those required to receive encoded lights-based communications from the light devices). Thus, with reference now to FIG. 8, a flowchart of an example procedure 800 for selective pixel activation of a light-capture device of a processor-based mobile device (such as the mobile devices 130, 220, 320, or 500 of FIG. 1, 2, 3, or 5) to detect and decode light-based communication(s) received from one or more light devices (such as the light devices 120a-b, 230, or 330a-f of FIGS. 1-3) is shown. The example procedure 800 is generally performed at the processor-based mobile device (although at least some operations may be performed at a remote server, such as the server 110 of FIG. 1) and includes determining 810 mobile device data and coarse previous field-of-view (FOV) data. The coarse, previous, FOV is representative of a coarse estimate or approximation, of the pixels of the light-capture device of the mobile device estimated to be receiving/detecting light corresponding to light-based communication from at least one light device located in an area where the mobile device is located. This coarse estimate may be based on a previous (relatively accurate) determination of the FOV for the at least one light device in the area of the mobile device. For example, an earlier complete, or partial, scan of the scene using the light-capture device sensor array may have been performed to determine which pixels of the sensor array received and/or detected light signals corresponding to light-based communication. This scan represent a baseline for the FOV, based on which a determination of which subsequent (future) pixels, that are likely to detect light signals from remote light devices, should be activated. For example, an initial FOV determination may result in a first region of active pixels (such as the region 710 of FIG. 7) corresponding to pixels detecting a light-based communication. Subsequently, a determination may be made that the mobile device has been rotated away from the light device whose light-based communication was detected by the pixels in the first region of active pixels. Accordingly, the subsequent region of active pixels (such as the second region of active pixels 760 depicted in FIG. 7B) that will subsequently detect the light-based communication from the same light device will have shifted relative to the first region, thus requiring that at least some additional pixels of the light-capture device's sensor array be activated, and possibly that some of the previously activated pixels be deactivated.

As noted, in some embodiments, determination of the coarse previous FOV may be performed through a complete or partial scan of the scene at which the light-capture device is directed. For example, periodically (e.g., every 1 second, 10 second, or any other appropriate period), pixels of the light-capture device's sensor array can be selectively activated to in order to identify in the current scene viewed by the light-capture device, light devices emitting light-based communications. In some embodiments, it may be sufficient to activate only some of the pixels (e.g., every other pixel of a row of pixels, and every other row) in order to identify the boundaries of regions of the sensor array that are receiving light signals from light devices. For example, in order to identify the borders of the first region 710 of FIG. 7A, only a limited number of the pixels of the sensors array would need to be activated (e.g., pre-determined, non-contiguous pixels of the sensor array). The selective, limited activation of pixels of the sensor array of the light-capture device is referred to as downsampling. Thus, in some embodiments, determining the coarse previous FOV data for the mobile device may include downsampling the pixels of the light-capture device of the mobile device to cause selective activation of some of the pixels of the light-capture device. In some embodiments, downsampling the pixels of the light-capture device may include activating different pixel locations at different pixel rows of the light-capture device (e.g., the particular rows and columns to activate may be performed according to one or more pre-determined patterns or profiles), in which case the baseline FOV is determined based on detected light levels at the different activated pixels location at the different pixel rows of the light-capture device.

The coarse previous FOV (i.e., a baseline FOV, based on which subsequent predicted pixels to activate are determined) may be associated with an uncertainty level. For example, when, upon a scan of a scene in order to detect/identify light devices, the number of pixels receiving light-based communications from light devices in the scene is relatively small (e.g., below some pre-determined threshold value), the coarse FOV determined from that current scan may be deemed to be high. Furthermore, the uncertainty level associated with a determined coarse FOV may vary as a function of time (e.g., the uncertainly may be increased from the time instance at which the scan establishing the coarse, baseline, FOV was taken). Accordingly, in some embodiments, a re-determination of a coarse (baseline) FOV may be periodically made based on the uncertainty of the present coarse FOV. For example, a re-scanning of the present scene viewable by the light-capture device may be triggered when the uncertainty level exceeds some pre-determined uncertainty threshold, or periodically at pre-determined intervals.

As noted, to predict which pixels to selectively activate also requires the determination of mobile device data (also referred to as physical state data), which may include one or more of, for example, orientation data for the mobile device, location estimate data for the mobile device, motion data for the mobile device, usage data for the mobile device representative of processes executing on the mobile device, etc. In some embodiments, the orientation and/or motion of the mobile device may be determined based, at least in part, on measurements from direction/inertial sensors of the mobile device, such as an accelerometer, gyroscope, and/or a magnetometer (as also described in relation to FIG. 5). For example, the orientation of the mobile device may be determined using an accelerometer (such as the accelerometer 530a of FIG. 5) to determine the direction of gravity (e.g., when the receiver is stationary, and the only force acting on it is gravity). Because, in such embodiments, the position/orientation of the accelerometer relative to some fixed feature of the mobile device (e.g., some defined axis of the housing of the mobile device) is known, the direction of gravity relative to that fixed feature of the mobile device can be derived. Alternatively and/or additionally, in some embodiments, the orientation of the mobile device may be derived/determined based on measurements from other types of sensing devices, such as magnetometers, gyroscopes, etc., as well as based on image data captured by one or more of the mobile device's light-capture devices. For example, one or more of the mobile device's light capture devices may be used to determine an angle of arrival of a light signal from a light device viewable from the mobile device (e.g., as described in relation to FIG. 6B). Because the spatial location and orientation of the light device are known, the location and/or orientation of the mobile device may be derived. Thus, based on measurements from which the relative orientation of the devices can be derived, and based further on the known spatial relationship of the sensing devices (be it an inertial sensing device, a light-capture device, etc.) to the mobile device to which these sensing devices are coupled or are housed in, the orientation of the mobile device (e.g., relative to an external frame of reference that may also be used to represent the positions and orientation of the various light devices transmitting the light-based signals that are to be detected by the mobile device) may be derived/determined.

The measurements from the mobile device's various inertial/orientation sensors may also be used to compute movement/motion for the mobile device (which is also is used to predict the sensor array's pixels to selectively activate). In some embodiments, movement of the mobile device may be derived based on positioning operations determined based on RF signals. For example, sequential positions of the mobile device may be derived based on RF signals received from satellite and/or terrestrial nodes (e.g., wireless WWAN or WLAN access points, satellite vehicles, etc.) The sequential positions at sequential time instances define motion of the mobile device during the interval between the sequential time instances. The motion data may constitute part of the physical state data for the mobile device, based on which selection of pixels to activate may be performed.

The mobile device data that is used to predict the pixels of the sensor array to selectively activate may also include such data as the mobile device's usage data representative of, for example, current operations performed by the mobile device. For example, when an incoming voice call is received by the mobile device (e.g., via a WWAN receiver module 516), or when there is some indication that the user wishes to originate a voice call, and orientation/motion measurements indicate that the user is displacing the mobile device towards his head (thus indicating that the user is going to answer the call, rather than directing the call to the voice mail system), a determination may be made that any light-based signals that may have been received through the light-capture device will no longer be detected through that light-capture device, and that, instead, other light-based signals from other light devices that may be viewable when the mobile device is positioned near the user's head may need to be detected. Thus, in this scenario, the usage data may be taken into account to predict which pixels to activate when the mobile device has been displaced to near the user's head (e.g., in this scenario, data representative of the location of the other light device relative to the current detected light device may also be required to predict which pixels to activate). In some embodiments, device usage data may also include historical data about the user's known device-usage habits and preferences. These habits and preferences may include, for example, where the user typically places the device (e.g., if the user is known to place the mobile device in the user's pocket, possibly only top-row pixels of the sensor array may be able to view and detect light signals from light devices), whether the user frequently checks the mobile device for e-mail and text message notifications, etc.

As noted, in some embodiments, the determined predicted one or more pixels may correspond, in effect, to one or more future FOV's of the light-capture device, indicative of the viewability of one or more light devices, in the area where the mobile device is located, capable of emitting light-based signals (e.g., VLC signals) in subsequent (future) time instances. For example, to determine such future FOV's, the likelihoods of using the different adjacent areas of the sensor array's current area of activated pixels may be determined, and the most likely adjacent pixels to receive light signals from light devices in the area of the mobile device (e.g., based upon current location of the mobile device, location of the light devices, motion state propagation of the mobile device, usage data, and so on) could then be activated. Thus, for example, in some embodiments, determining the one or more future FOV's may include determining pixel locations of a current set of active pixels of the light-capture device receiving the light-based signals from the at least one light device, and adjusting the current locations of the current set of the active pixels receiving light signals from the light-based signals of the at least one light device during subsequent time instances based, at least in part, the mobile device data, with the adjusted locations of the current set of active pixels corresponding to probable pixels of the light-capture device likely to receive the light-based signals of the at least one light device during the subsequent time instances.

Turning back to FIG. 8, having determined the mobile device data and the coarse previous FOV (i.e., the baseline FOV), predicted one or more pixels of the light-capture device of the mobile device likely to receive light signals from one or more light devices (which may include the at least one light device from where the light signals used to determine the baseline FOV were detected), in the area where the mobile device is located, capable of emitting one or more light-based communications are determined 820 based on the mobile device data and the coarse, previous, FOV data. The determined predicted one or more pixels correspond, in effect, to a future FOV of the light-capture device, indicative of the viewability of one or more light devices capable of emitting light-based signals (e.g., VLC signals). The determined predicted one or more pixels/cells of the light-capture device are then activated 830. Currently activated pixels that are predicted to subsequently not receive light-based signals (e.g., as the mobile device changes its orientation or location) may be de-activated, to thus allow preservation of the mobile device's power (e.g., provided by the power source 580 schematically depicted in FIG. 5). With the predicted one or more pixels activated, the procedure 800 may be repeated either from operation 810 (determining mobile device data, including, for example, the mobile device's current motion and orientation, and/or a new coarse previous FOV data) or from operation 820 (e.g., predicting the next set of pixels to activate based, for example, on previously determined mobile device data and/or earlier determined coarse previous FOV data).

Thus, as noted, upon determining mobile device data that includes data about spatial or physical state (e.g., the mobile device's motion, orientation), current usage of the mobile device, etc., the previously determined field-of-view (i.e., the region of active pixels of the light-capture device's sensor array) can be dynamically adjusted to track changes to, for example, the mobile device's spatial state. For example, if, as also illustrated in FIGS. 7A and 7B, it is determined (e.g., based on measurement data from the mobile device's inertial sensors, based on computed changes to the location of the mobile device, or based on other information and criteria) that the orientation of the mobile device is changing, the region of active pixels can be adjusted so as to activate those pixels of the sensor array likely (predicted) to receive light signals from the viewable light device(s) in the mobile device's subsequent spatial state. The mobile device data may also be used to de-activate currently active pixels that will likely cease receiving light signals from the light device currently viewable by the light-capture device(s).

In some embodiments, determination of the predicted pixels to activate may further be based on locations of light devices transmitting light-based communications (e.g., VLC communications) that may be in the area where the mobile device is located. Location information for the light devices (which may be located in the area where the mobile device is located) may be determined based on, for example, assistance data for the light devices (representative of positions and/or orientations of such light devices), and/or prior detection of light devices (e.g., performed through periodic scanning operations, in which a determination is made of which pixels of the mobile device's sensor array receives light-based signals). Assistance data may be downloaded to the mobile device from a central server (such as a central location server) in response to a request sent by the mobile device to the central server, or as a result of periodic broadcast of assistance data to wireless devices within range of transmitters transmitting such assistance data. The known locations and/or orientations of light devices in the area of the mobile device can be used to determine which light devices transmitting light-based communications may be coming into view of the light-capture device(s) of the mobile device, as the mobile device's location and/or orientation changes. For example, based on the location (absolute, or relative to the location of the mobile device) of a light device currently not in the view of the mobile device's light-capture device, and based on spatial data (e.g., changing location and/or orientation of the mobile device), the time at which that light device will become viewable by the light-capture device, as well as the approximate area of the sensor array at which light from that light device will be detected, can be derived, thus allowing the mobile device to cause pixels in that sensor array area to be activated. It is noted that as one light device comes into view, other light devices currently viewable by the light-capture device may, or may not, remain viewable. Thus, a light-capture device may view simultaneously light signals from multiple light devices that are within the view of the light-capture device. The mobile device may also be configured to determine the exact dimensions (i.e., the particular pixels) of the additional pixel areas of its sensor array that need to be activated (to receive the light signals transmitted by the light device(s) that is/are coming into view) based, in part, on the distance of the mobile device from that light device(s).

In some embodiments, assistance data pertaining to light devices may also include their configuration and dimensions (e.g., shapes, for example, circular, rectangular, etc.) Shape information, for example, may be used to match detected light signals on the sensor array of the light-capture device to possible light devices in the area of the mobile device, and/or to activate pixels of the sensor array if there is a mismatch or discrepancy between the resulting shape defined by the more brightly illuminated areas of the sensor array's active pixels and the expected shape. For example, if a light signal received on the sensor array can be determined to correspond to two possible light device candidates (e.g., as may have been determined based on the mobile device data and/or location data for the light devices), with one of the candidates being a light device with a rectangular illumination profile and the other with the circular illumination profile, the determined shape of the illuminated area in of the active pixels of the sensor array may be used to select between the two candidate light devices. In another example, the expected shape of the illumination profile from a light device may be used to activate non-active pixels on the sensor array so as to cause the detected light signal shape to more closely match the illumination profile of the light device (e.g., if the detected shape of active pixels on the sensor array is a broken circle, and the known illumination profile for the corresponding light device is circular, the mobile device may activate currently inactive pixels to cause the currently detected lights-signal shape to define a completed circle).

As noted, the distance (as well as the relative or absolute location of the mobile device) may be determined based on any of the location determination techniques/procedures described herein. Such location determination techniques may include, for example, deriving position fixes for the mobile device through fingerprinting-based procedures, through implementations of multilateration-based procedures using, for example, timing-based techniques (e.g., observed-time-difference-of-arrival (or OTDOA), RTT-based measurements, etc.), signal strength measurements (e.g., RSSI measurements), etc., using RF signals received from satellite nodes and/or from ground-based (terrestrial) nodes, and so on. Furthermore, in some embodiments, a coarse location for the mobile device may be derived based on the identity of a wireless node (e.g., a cellular base station or WLAN access point), with the mobile device assigned a location approximation that may be, for example, the known location of the wireless node (that approximation may then correspond to a relatively high uncertainty level). Additionally, position fixes may be derived according to a procedure such as that described in relation to FIG. 6A, in which a light device with a known location and known features (e.g., edges) and dimensions is identified through receipt of light-based communication from the light device by one of the light-capture devices of the mobile device, and computation of the location for the mobile device based on the location and visible features of the identified light device. Position fixes may also be determined based on angle-of-arrival techniques, such as the techniques described in relation to FIG. 6B. In some embodiments, based on the light device/fixture location and the mobile device's position and orientation, the angle-of-arrival of the light signals onto the image sensor can be computed, and using the computed angle-of-arrival of the light signal, the approximate pixel location of the sensor array (image sensor) of the mobile device at which the light fixture VLC signals land can be predicted and selectively activated (e.g., to track the changing position angle of the light signal arriving at the moving mobile device at subsequent time instances).

Thus, in some embodiments, determining the predicted one or more pixels may include determining location information for the one or more light devices (which may be located in the area where the mobile device is located), and determining the predicted one or more pixels based further on the location information for the one or more light devices.

To further control power utilization (e.g., to preserve mobile device power), cells/pixels of the light-capture device's sensor array may be selectively activated/de-activated based on distance from a light device transmitting light-based signal, and/or based on measured signal strength/level for that light-based signal. Accordingly, in such embodiments, determining the predicted one or more pixels of the light-capture device may include determining the predicted one or more pixels based further on the signal light level for the light emissions from the light device.

Particularly, when the mobile device is closer to a light device, the light-capture device of the mobile device will receive more light from the light device than if it were farther away. In that situation, more of the cells/pixels of the sensor array will be detecting the light-based signal from the light device. However, it may not be necessary to use all of the pixels receiving the light signal in order to decode the light-based signal. Thus, if, for example, the signal-to-noise ratio (SNR) for a light signal is higher than some predetermine SNR threshold required to decode the light-based signals, at least some of the pixels receiving the light-based signal may be deactivated (e.g., to create a non-contiguous pixel activation pattern in which, for example, various neighboring cells of an active cell/pixel receiving light-based signals are deactivated). Accordingly, in some implementations, to selectively control activation of the pixels of the light-capture device, a signal-to-noise ratio (absolute or relative) for light emission from at least one light device nay be determined. In such implementations, determining the predicted one or more pixels of the light-capture device that are to be activated may also include identifying for de-activation at least some of currently activated pixels of the light-capture device in response to a determination that the light signal levels (which may be expressed as average SNR) for the received light emissions are above some SNR threshold.

In some embodiments, determining, for a particular light-capture device, the light signal levels received from light devices viewable by the particular light-capture device may be based on a comparison of the light levels (measured by pixels on a sensor array for a particular light capture device) to background light levels, to thus determine relative light signal levels. For example, on a sensor array (image sensor), such as the sensor array 700 of FIGS. 7A and 7B, the region of pixels which receives light from light fixtures/devices will generally be more brightly illuminated relative to the rest of the pixels. If the more brightly illuminated region is shaped similarly to a field-of-view expected for light received from a light device (e.g., a substantially rectangular or circular field-of-view), then light signal levels for background pixels (e.g., pixels outside the more brightly illuminated field-of-view corresponding to a light device) may be used as a reference light signal level to compare to the light signal levels within the more brightly illuminated area.

Thus, in some embodiments, selection, or non-selection, of various pixels of a sensor array for a light-capture device may be based on whether relative light-signal levels exceeds some minimum threshold (if the threshold is not exceeded, this may be an indication that the light level for signals received from viewable light devices are not high enough to decode encoded light signals). An example of such a minimum threshold may be 60% (or some other percentage value) of the luma value, S, of the entire image obtained during determination of, for example, the coarse FOV. Additionally and/or alternatively, in some embodiments, selection of light pixels may also be based on whether detected light levels are below some high threshold. Particularly, when the light signal level received from a particular light device is too high (e.g., relative to light levels of background pixels, with the relative allowable difference between the light levels expressed as some pre-determined high, or over-exposure, threshold), this may adversely affect VLC signal decoding (e.g., it may be more difficult to distinguish between light encoded symbols within the light signal). Thus, in an over exposure condition, a sensor array of a light-capture device may not be able to provide the VLC position. In such situations, over-exposed pixels areas of the sensor array (or the entire sensor array) may be unselected (or de-activated). It should be noted that reducing the number of active pixels in response to exceeding an SNR threshold may result in coarser tracking functionality based on resulting outline of the light signal, which may thus result in loss of positioning accuracy (i.e., loss of accuracy relative to the ability to track the mobile device location, due to reduced accuracy in determining the angle and distance from the light fixture based on shape and orientation of the fixture as projected onto the sensor array).

In some embodiments, activation of pixels may also be based on the number of light devices detectable by the various light-capture devices. For example, in order to perform positioning determination for the mobile device, a minimum number of light devices may need to be detected (e.g., three (3) measurements may be needed, in some embodiments, to perform location determination). Thus, if the number of currently detectable light devices (as may be determined according to regions of pixels that are more brightly illuminated than background pixels, and which define shapes corresponding to shapes, such as a rectangle, a circle, etc., expected to result from illumination received from a light device) is less than some threshold number (e.g., a minimum number, such 1, 2, 3, or any pre-determined number), additional areas of the sensor array (or additional cameras, if available) may need to be activated until the required number of light devices is detected. The selection of additional areas of pixels and/or additional cameras to activate may be random, may be made according to some pre-determined order of camera activation, or may be based on available data, such as location data for the mobile device and for light devices in the vicinity of the mobile device, usage data, etc., to controllably select the additional pixels and/or light-capture device to activate.

In some embodiments, controllable activation/de-activation of the pixels of the sensor array of the mobile device's light-capture device may be used to control the frame rate for the mobile device's light-capture device. Particularly, the time required to read signals from the sensor array may depend on the number of cells/pixels activated by the user. The frame rate can be increased (in a linear, or near-linear, manner) when fewer pixels need to be read out. Thus, for example, when the signal strength (measured and/or computed in terms of SNR) for a light-based signal from a light device is low, and the field of view for the light-based signal from a light device is known, the frame rate can be increased by activating only a subset of the pixels of the sensor array's area corresponding to the known FOV. In that way, the light-capture device of the mobile device can capture more of the light-based signal without increasing the power consumption. Accordingly, in such embodiments, determining the predicted one or more pixels based further on the light signal level for the received light emissions corresponding to the light-based signal from at least one light device may include identifying for de-activation at least some of currently activated pixels of the light-capture device in response to a determination that the SNR for the received light emissions is below some SNR threshold in order to cause an increase of a frame rate for the light-capture device. Alternatively and/or additionally, in some embodiments, determining the predicted one or more pixels based further on the light signal level for the received light emissions corresponding to the light-based signal from the at least one light device may include increasing a frame rate of the light-capture device, and deactivating at least some of currently activated pixels of the light-capture device, upon increasing the frame rate, in response to a determination that the light signal level for the received light emissions is below an SNR threshold.

It is to be noted that many different examples exist as to how determined mobile device data (e.g., physical state data, which may include orientation and/or motion) can be used to determine predicted pixels to activate (or de-activate). For example, movement of the mobile device, as determined from inertial/directional sensors measurements, may be used to determine hand gestures, or other actions undertaken by the user, which also provide useful indication of which light-capture devices should be selected/activated. For example, an increase in an elevation of the mobile device, and/or other measurements indicating the mobile device is being lifted and/or being brought closer to the user's head, may indicate that the scene viewable from the light-capture device will change. Thus, based on that determination of the motion and/or orientation of the mobile device, the likely scene viewable from the camera, and consequently the possible light devices in that scene, may be determined, thus allowing prediction of pixels of the camera's sensor array to activate/de-activate.

In some embodiments, determining the predicted pixels to activate may also be determined based on previous (historical) light signal levels that are sensed from surrounding light sources at a first location and/or a first orientation of the mobile device (e.g., at a first time instance). For example, the light signal levels, which generally would correlate with the viewability of the surrounding light devices, may have been determined (e.g., by performing a full or partial scan in which all the pixels of the light-capture device are activated to capture an image of the scene). As the mobile device is moved, at a second, later, time instance, from a first location to a second destination location, or from a first orientation, to a second destination orientation, the light signal levels at the first time instance (corresponding to the first location or the first orientation) may be used to predict the light signal levels, from the respective light devices, that would be detected by the various light-capture devices at the second destination location and/or orientation of the mobile device.

As discussed, received light, corresponding to light-based signals transmitted from one or more light devices, can be decoded to determine data encoded in the light-based signal(s). Where the light-based signal comprises an identifier of the light device, or some indication of the location of the light device, a location of the mobile device may be determined. More particularly, having determined and activated predicted pixels likely to receive light based signals from one or more light devices appearing in the scene viewed from the light-capture device, at least part of at least one image of at least one scene, comprising at least one light device emitting at least one light-based communication, is captured. As discussed, the capturing of the at least part of the image may be performed with a camera that includes an image/sensor array, such as a CMOS image sensor, a charge-couple device (CCD)-type camera, etc., operating in conjunction with a gradual-exposure mechanism (e.g., a rolling shutter) that captures the scene over a period of time, with different scan lines (or rows) corresponding to different time instances during which the modulated light signal varies (in a manner that is not perceptible to humans, but which nonetheless can be resolved using the light-capture device).

In situations where the light-based signal detected by the activated signals is a VLC signal, decoding the light-based signal may include identifying from the captured at least part of the at least one image at least one signal representative of one or more symbols comprising at least one VLC codeword encoded in the at least one VLC signal, and determining, at least in part, the at least one VLC codeword from the at least one signal identified from the captured at least part of the at least one image. As noted, the determined VLC codeword may correspond to an identifier identifying the light device/source from which the light-based signal was received, and thus the identity of the light device, and by extension the known location associated with that light device, can be determined. Using the known location, features, and/or dimensions of the identified light device, a location fix of the mobile device may then be determined.

Performing the procedures described herein may be facilitated by a processor-based computing system. With reference to FIG. 9, a schematic diagram of an example computing system 900 is shown. Part or all of the computing system 900 may be housed in, for example, a handheld mobile device such as the devices 130, 220, 320, 500, 610, and 660 of FIGS. 1, 2, 3, 5, 6A, and 6B, respectively, or may comprise part or all of the servers, nodes, access points, base stations, or light devices described herein, including the light devices 120a-b, and/or the nodes 104a-c and 106a-d, depicted in FIG. 1. The computing system 900 includes a computing-based device 910 such as a personal computer, a specialized computing device, a controller, and so forth, that typically includes a central processor unit 912. In addition to the CPU 912, the system includes main memory, cache memory and bus interface circuits (not shown). The computing-based device 910 may include a mass storage device 914, such as a hard drive and/or a flash drive associated with the computer system. The computing system 900 may optionally further include a keyboard, or keypad, 916, and/or a monitor 920, e.g., a CRT (cathode ray tube) or LCD (liquid crystal display) monitor, that may be placed where a user can access them (e.g., a mobile device's screen). In some embodiments, the keyboard and monitor may be located remotely from the computing-based device 910 (e.g., when the computing-based device is a central server that operators can access remotely).

The computing-based device 910 is configured to facilitate, for example, the implementation of one or more of the procedures/processes/techniques described herein (including the procedures for predicting pixels/cells of a sensor array to activate in order to reduce power consumption for light-based signal detection, and extend battery life of a power unit of a mobile device). The mass storage device 914 may thus include a computer program product that when executed on the computing-based device 910 causes the computing-based device to perform operations to facilitate the implementation of the procedures described herein. The computing-based device may further include peripheral devices to provide input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. For example, as illustrated in FIG. 9, the computing-based device 910 may include an interface 918 with one or more interfacing circuits, such interfacing circuits may include, for example, a wireless port that includes transceiver circuitry, a network port (such as a port 919a) with circuitry to interface with one or more network device (including with network devices that include a radio-access network (RAN), a WiFi network, and so on), a powerline interface (such as an interface 919b) to interface with devices (such as light devices as the light device 230 and/or the controller 210 of FIG. 2) via powerlines, and other types of interfaces to provide/implement communication with remote devices. Alternatively and/or additionally, in some embodiments, special purpose logic circuitry, e.g., an FPGA (field programmable gate array), a DSP processor, or an ASIC (application-specific integrated circuit) may be used in the implementation of the computing system 900. Other modules that may be included with the computing-based device 910 are speakers, a sound card, a pointing device, e.g., a mouse or a trackball, by which the user can provide input to the computing system 900. The computing-based device 910 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the computing-based device 910 or external to the device. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

The detailed description set forth above in connection with the appended drawings is provided to enable a person skilled in the art to make or use the disclosure. It is contemplated that various substitutions, alterations, and modifications may be made without departing from the spirit and scope of the disclosure. Throughout this disclosure the term "example" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

Although particular embodiments have been disclosed herein in detail, this has been done by way of example for purposes of illustration only, and is not intended to be limiting with respect to the scope of the appended claims, which follow. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method to process one or more light-based signals, the method comprising:
   determining, by a mobile device, mobile device data and coarse previous field-of-view (FOV) data representative of pixels of a light-capture device of a mobile device that detected light-based signals from at least one light device located in an area where the mobile device is located;
   determining, by a mobile device, location information for one or more light devices, in the area where the mobile device is located, capable of emitting one or more light-based communications, wherein the location information comprises: 1) assistance data for the one or more light devices representative of a position of the one or more light devices, or orientation of the one or more light devices, or any combination thereof, or 2) prior detection information regarding previous light detection operations performed by the mobile device, or 3) any combination thereof;
   determining, by a mobile device, based on the mobile device data, the location information, and the coarse previous FOV data, predicted one or more pixels of the light-capture device of the mobile device likely to receive light signals from the one or more light devices; and
   activating, by a mobile device, the predicted one or more pixels of the light-capture device.

2. The method of claim 1, wherein the mobile device data comprises: orientation data for the mobile device, location estimate data for the mobile device, motion data for the mobile device, or usage data for the mobile device representative of processes executing on the mobile device, or any combination thereof.

3. The method of claim 1, wherein determining the predicted one or more pixels comprises:
determining one or more future field of views (FOV's) for the mobile device based on the mobile device data and the coarse previous FOV data for the mobile device.

4. The method of claim 3, wherein determining the one or more future FOV's comprises:
determining current pixel locations of a current set of active pixels of the light-capture device receiving the light-based signals from the at least one light device; and
adjusting the current pixel locations of the current set of the active pixels receiving light signals from the light-based signals of the at least one light device during subsequent time instances based on the mobile device data, with the adjusted locations of the current set of active pixels corresponding to probable pixels of the light-capture device likely to receive the light-based signals of the at least one light device during the subsequent time instances.

5. The method of claim 1, wherein determining the coarse previous FOV data for the mobile device comprises downsampling the pixels of the light-capture device of the mobile device to cause selective activation of some of the pixels of the light-capture device;
and wherein determining the predicted one or more pixels comprises determining one or more future FOV's for the mobile device based, at least in part, on the downsampled pixels for the light-capture device of the mobile device.

6. The method of claim 5, wherein downsampling the pixels of the light-capture device comprises:
activating different pixel locations at different pixel rows of the light-capture device.

7. The method of claim 1, further comprising:
determining a light signal level for received light emissions corresponding to a light-based signal from the at least one light device;
wherein determining the predicted one or more pixels of the light-capture device comprises:
determining the predicted one or more pixels based further on the light signal level for the received light emissions corresponding to the light-based signal from the at least one light device.

8. The method of claim 7, wherein determining the predicted one or more pixels based further on the light signal level for the received light emissions corresponding to the light-based signal from the at least one light device comprises:
deactivating at least some of currently activated pixels of the light-capture device in response to a determination that the light signal level for the received light emissions exceeds an SNR threshold.

9. The method of claim 7, wherein determining the predicted one or more pixels based further on the light signal level for the received light emissions corresponding to the light-based signal from the at least one light device comprises:
increasing a frame rate of the light-capture device; and
deactivating at least some of currently activated pixels of the light-capture device, upon increasing the frame rate, in response to a determination that the light signal level for the received light emissions is below an SNR threshold.

10. The method of claim 1, wherein the one or more light-based communications comprise one or more visual light communication (VLC) signals, and wherein the method further comprises decoding the one or more light-based communications, including:
identifying from image data including the at least one light device, the one or more VLC signals representative of one or more symbols comprising one or more VLC codewords encoded in the one or more VLC signals, wherein the image data is captured by the predicted one or more pixels; and
determining, at least in part, the one or more VLC codewords from the one or more VLC signals.

11. The method of claim 10, further comprising:
determining a location estimate of the mobile device based, at least in part, on the determined one or more VLC codewords.

12. The method of claim 1, wherein the light-capture device comprises a digital light sensor with rolling shutter capability.

13. A mobile device comprising:
one or more sensors configured to determine mobile device data for the mobile device;
one or more light-capture devices;
memory to store computer instructions; and
one or more processors, coupled to the memory, the one or more sensors, and the one or more light-capture devices, the one or more processors configured to:
determine coarse previous field-of-view (FOV) data representative of pixels of a light-capture device, from the one or more light-capture devices of the mobile device, that detected light-based signals from at least one light device located in an area where the mobile device is located;
determine location information for one or more light devices, in the area where the mobile device is located, capable of emitting one or more light-based communications, wherein the location information comprises: 1) assistance data for the one or more light devices representative of a position of the one or more light devices, or orientation of the one or more light devices, or any combination thereof, or 2) prior detection information regarding previous light detection operations performed by the mobile device, or 3) any combination thereof;
determine, based on the mobile device data, the location information, and the coarse previous FOV data, predicted one or more pixels of the light-capture device of the mobile device likely to receive light signals from the one or more light devices; and
activate the predicted one or more pixels of the light-capture device.

14. The mobile device of claim 13, wherein the mobile device data comprises: orientation data for the mobile device, location estimate data for the mobile device, motion data for the mobile device, or usage data for the mobile device representative of processes executing on the mobile device, or any combination thereof.

15. The mobile device of claim 13, wherein the one or more processors configured to determine the predicted one or more pixels are configured to:
determine one or more future field of views (FOV's) for the mobile device based on the mobile device data and the coarse previous FOV data for the mobile device.

16. The mobile device of claim 13, wherein the one or more processors configured to determine the coarse previous FOV data for the mobile device are configured to downsample the pixels of the light-capture device of the mobile device to cause selective activation of some of the pixels of the light-capture device;

and wherein the one or more processors configured to determine the predicted one or more pixels are configured to determine one or more future FOV's for the mobile device based, at least in part, on the downsampled pixels for the light-capture device of the mobile device.

17. The mobile device of claim 16, wherein the one or more processors configured to downsample the pixels of the light-capture device are configured to activate different pixel locations at different pixel rows of the light-capture device.

18. The mobile device of claim 13, wherein the one or more processors are further configured to determine a light signal level for received light emissions corresponding to a light-based signal from the at least one light device;

wherein the one or more processors configured to determine the predicted one or more pixels of the light-capture device are configured to determine the predicted one or more pixels based further on the light signal level for the received light emissions corresponding to the light-based signal from the at least one light device.

19. The mobile device of claim 18, wherein the one or more processors configured to determine the predicted one or more pixels based further on the light signal level for the received light emissions corresponding to the light-based signal from the at least one light device are configured to:

deactivate at least some of currently activated pixels of the light-capture device in response to a determination that the light signal level for the received light emissions exceeds an SNR threshold.

20. The mobile device of claim 13, wherein the one or more light-based communications comprise one or more visual light communication (VLC) signals, and wherein the one or more processors are further configured to decode the one or more light-based communications, including to:

identify, from image data including the one or more light devices, the one or more VLC signals representative of one or more symbols comprising one or more VLC codewords encoded in the one or more VLC signals, wherein the image data is captured by the predicted one or more pixels; and determine, at least in part, the one or more VLC codewords from the one or more VLC signals.

21. An apparatus comprising:

means for determining mobile device data and coarse previous field-of-view (FOV) data representative of pixels of a light-capture device of a mobile device that detected light-based signals from at least one light device located in an area where the mobile device is located;

means for determining location information for one or more light devices, in the area where the mobile device is located, capable of emitting one or more light-based communications, wherein the location information comprises: 1) assistance data for the one or more light devices representative of a position of the one or more light devices, or orientation of the one or more light devices, or any combination thereof, or 2) prior detection information regarding previous light detection operations performed by the mobile device, or 3) any combination thereof;

means for determining, based on the mobile device data, the location information, and the coarse previous FOV data, predicted one or more pixels of the light-capture device of the mobile device likely to receive light signals from the one or more light devices; and means for activating the predicted one or more pixels of the light-capture device.

22. The apparatus of claim 21, wherein the mobile device data comprises:

orientation data for the mobile device, location estimate data for the mobile device, motion data for the mobile device, or usage data for the mobile device representative of processes executing on the mobile device, or any combination thereof.

23. The apparatus of claim 21, wherein the means for determining the coarse previous FOV data for the mobile device comprises means for downsampling the pixels of the light-capture device of the mobile device to cause selective activation of some of the pixels of the light-capture device;

and wherein the means for determining the predicted one or more pixels comprises means for determining one or more future FOV's for the mobile device based, at least in part, on the downsampled pixels for the light-capture device of the mobile device.

24. The apparatus of claim 21, further comprising:

means for determining a light signal level for received light emissions corresponding to a light-based signal from the at least one light device;

wherein the means for determining the predicted one or more pixels of the light-capture device comprises means for determining the predicted one or more pixels based further on the light signal level for the received light emissions corresponding to the light-based signal from the at least one light device.

25. A non-transitory computer readable media programmed with instructions, executable on a processor, to:

determine mobile device data and coarse previous field-of-view (FOV) data representative of pixels of a light-capture device of a mobile device that detected light-based signals from at least one light device located in an area where the mobile device is located;

determine location information for one or more light devices, in the area where the mobile device is located, capable of emitting one or more light-based communications, wherein the location information comprises: 1) assistance data for the one or more light devices representative of a position of the one or more light devices, or orientation of the one or more light devices, or any combination thereof, or 2) prior detection information regarding previous light detection operations performed by the mobile device, or 3) any combination thereof;

determine, based on the mobile device data, the location information, and the coarse previous FOV data, predicted one or more pixels of the light-capture device of the mobile device likely to receive light signals from the one or more light devices; and activate the predicted one or more pixels of the light-capture device.

* * * * *